United States Patent
Ray et al.

(10) Patent No.: US 10,085,073 B2
(45) Date of Patent: Sep. 25, 2018

(54) TARGETING TV ADVERTISING SLOTS BASED ON CONSUMER ONLINE BEHAVIOR

(71) Applicant: VideoAmp, Inc., Santa Monica, CA (US)

(72) Inventors: Debajyoti Ray, Marina del Ray, CA (US); Ross McCray, Santa Monica, CA (US); David Gullo, Laguna Hills, CA (US); Jay Prasad, San Francisco, CA (US)

(73) Assignee: VideoAmp, Inc., Los Angeles, CA (US)

( * ) Notice: Subject to any disclaimer, the term of this patent is extended or adjusted under 35 U.S.C. 154(b) by 0 days.

(21) Appl. No.: 15/219,259

(22) Filed: Jul. 25, 2016

(65) Prior Publication Data

US 2017/0034591 A1     Feb. 2, 2017

Related U.S. Application Data

(60) Provisional application No. 62/196,637, filed on Jul. 24, 2015, provisional application No. 62/317,440, (Continued)

(51) Int. Cl.
*H04N 21/81* (2011.01)
*H04N 21/258* (2011.01)
(Continued)

(52) U.S. Cl.
CPC ....... *H04N 21/812* (2013.01); *G06Q 30/0269* (2013.01); *G06Q 30/0275* (2013.01);
(Continued)

(58) Field of Classification Search
CPC .......... H04N 21/812; H04N 21/25883; H04N 21/25891; H04N 21/2668; H04N 21/4532;
(Continued)

(56) References Cited

U.S. PATENT DOCUMENTS

| 6,009,407 A | 12/1999 | Garg |
| 6,055,573 A | 4/2000 | Gardenshwartz et al. |

(Continued)

OTHER PUBLICATIONS

PCT International Search Report, Application No. PCT/US17/13569, dated Apr. 14, 2017, 2 sheets.
(Continued)

*Primary Examiner* — Randy A Flynn
(74) *Attorney, Agent, or Firm* — McDermott Will & Emery LLP; Richard G. A. Bone

(57) ABSTRACT

Within an advertising buying platform, advertising buyers are able to direct advertising content to TV/OTT/VOD inventory that matches targeted market segments. The advertising buyers select from a list of available market segments, and the system pairs the market segments to an anonymous dataset of media consumers (using a database of hashed online IDs). The dataset of hashed online IDs is then mapped to external OEM IDs (such as from a Smart TV) via the functions of a hashed identity mapping method. This permits the advertiser to target advertising content to a population of TV viewers. Also described herein are methods of bidding on programmatic TV content.

8 Claims, 11 Drawing Sheets

Related U.S. Application Data filed on Apr. 1, 2016, provisional application No. 62/264,764, filed on Dec. 8, 2015.

(51) Int. Cl.

| | | |
|---|---|---|
| *H04N 21/2668* | (2011.01) | |
| *H04N 21/45* | (2011.01) | |
| *H04N 21/643* | (2011.01) | |
| *H04N 21/845* | (2011.01) | |
| *H04N 21/472* | (2011.01) | |
| *G06Q 30/02* | (2012.01) | |
| *H04L 29/06* | (2006.01) | |

(52) U.S. Cl.
CPC ... *H04L 65/4084* (2013.01); *H04N 21/25883* (2013.01); *H04N 21/25891* (2013.01); *H04N 21/2668* (2013.01); *H04N 21/4532* (2013.01); *H04N 21/64322* (2013.01); *H04N 21/8456* (2013.01); *H04L 65/4076* (2013.01); *H04N 21/47202* (2013.01)

(58) Field of Classification Search
CPC ......... H04N 21/64322; H04N 21/8456; H04N 21/47202; G06Q 30/0269; G06Q 30/0275; H04L 65/4084; H04L 65/4076
See application file for complete search history.

(56) References Cited

U.S. PATENT DOCUMENTS

| | | | |
|---|---|---|---|
| 6,061,691 | A | 5/2000 | Fox |
| 6,119,101 | A | 9/2000 | Peckover |
| 6,253,187 | B1 | 6/2001 | Fox |
| 6,298,330 | B1 | 10/2001 | Gardenswartz et al. |
| 6,567,824 | B2 | 5/2003 | Fox |
| 6,868,389 | B1 | 3/2005 | Wilkin et al. |
| 6,895,387 | B1 | 5/2005 | Roberts et al. |
| 6,920,464 | B2 | 7/2005 | Fox |
| 6,937,996 | B1 | 8/2005 | Forsythe et al. |
| 6,993,494 | B1 | 1/2006 | Boushy et al. |
| 7,062,510 | B1 | 6/2006 | Eldering |
| 7,136,871 | B2 | 11/2006 | Ozer et al. |
| 7,158,943 | B2 | 1/2007 | van der Riet |
| 7,222,099 | B2 | 5/2007 | Forsythe et al. |
| 7,228,287 | B1 | 6/2007 | Samson et al. |
| 7,356,547 | B2 | 4/2008 | Ozer et al. |
| 7,363,254 | B2 | 4/2008 | Skinner |
| 7,423,406 | B2 | 9/2008 | Geniusz |
| 7,444,658 | B1 | 10/2008 | Matz et al. |
| 7,536,316 | B2 | 5/2009 | Ozer et al. |
| 7,548,929 | B2 | 6/2009 | Collins et al. |
| 7,574,404 | B2 | 8/2009 | Forsythe et al. |
| 7,661,118 | B2 | 2/2010 | Matz et al. |
| 7,689,590 | B2 | 3/2010 | Fox |
| 7,729,940 | B2 | 6/2010 | Harvey et al. |
| 7,761,346 | B2 | 7/2010 | Cooper et al. |
| 7,801,778 | B2 | 9/2010 | Fox |
| 7,802,280 | B2 | 9/2010 | Zigmond et al. |
| 7,831,685 | B2 | 11/2010 | Dai et al. |
| 7,835,937 | B1 | 11/2010 | Karlsson et al. |
| 7,835,939 | B1 | 11/2010 | Karlsson et al. |
| 7,844,492 | B2 | 11/2010 | Perkowski et al. |
| 7,870,023 | B2 | 1/2011 | Ozer et al. |
| 7,904,327 | B2 | 3/2011 | Phelan et al. |
| 7,917,388 | B2 | 3/2011 | van der Riet |
| 7,925,549 | B2 | 4/2011 | Looney et al. |
| 7,945,474 | B1 | 5/2011 | Koinov |
| 7,945,928 | B2 | 5/2011 | Matz et al. |
| 7,949,561 | B2 | 5/2011 | Briggs |
| 7,949,562 | B2 | 5/2011 | Collins |
| 7,949,563 | B2 | 5/2011 | Collins |
| 7,974,889 | B2 | 7/2011 | Raimbeault |
| 8,000,993 | B2 | 8/2011 | Harvey et al. |
| 8,006,261 | B1 | 8/2011 | Haberman et al. |
| 8,060,398 | B2 | 11/2011 | Canning et al. |
| 8,069,142 | B2 | 11/2011 | Davis et al. |
| 8,090,613 | B2 | 1/2012 | Kalb et al. |
| 8,099,316 | B2 | 1/2012 | Moukas et al. |
| 8,099,317 | B2 | 1/2012 | Moukas et al. |
| 8,099,318 | B2 | 1/2012 | Moukas et al. |
| 8,099,323 | B2 | 1/2012 | Veeraraghavan |
| 8,112,301 | B2 | 2/2012 | Harvey et al. |
| 8,117,050 | B2 | 2/2012 | Li et al. |
| 8,117,067 | B2 | 2/2012 | Ketchum |
| 8,135,626 | B2 | 3/2012 | Das et al. |
| 8,180,891 | B1 | 3/2012 | Harrison |
| 8,160,916 | B2 | 4/2012 | Moukas et al. |
| 8,175,914 | B1 | 5/2012 | Benson et al. |
| 8,195,508 | B1 | 6/2012 | Calder et al. |
| 8,239,242 | B2 | 8/2012 | Moukas et al. |
| 8,249,925 | B2 | 8/2012 | Broms et al. |
| 8,255,949 | B1 | 8/2012 | Bayer et al. |
| 8,265,996 | B2 | 9/2012 | Steelberg et al. |
| 8,296,793 | B2 | 10/2012 | Johnson |
| 8,321,273 | B2 | 11/2012 | Briggs |
| 8,321,274 | B2 | 11/2012 | Collins et al. |
| 8,321,275 | B2 | 11/2012 | Collins et al. |
| 8,341,047 | B1 | 12/2012 | Furney et al. |
| 8,346,593 | B2 | 1/2013 | Fanelli et al. |
| 8,346,607 | B1 | 1/2013 | Benson et al. |
| 8,352,307 | B2 | 1/2013 | Moukas et al. |
| 8,352,320 | B2 | 1/2013 | MacDonald et al. |
| 8,386,310 | B2 | 2/2013 | Weyer et al. |
| 8,386,398 | B1 | 2/2013 | Hickman |
| 8,392,252 | B2 | 3/2013 | Kaufman et al. |
| 8,401,887 | B2 | 3/2013 | Moukas et al. |
| 8,402,482 | B2 | 3/2013 | Woodward et al. |
| 8,417,556 | B2 | 4/2013 | Moukas et al. |
| 8,423,408 | B1 | 4/2013 | Barnes et al. |
| 8,442,859 | B1 | 5/2013 | Broms et al. |
| 8,473,339 | B1 | 6/2013 | McKennon et al. |
| 8,478,675 | B1 | 7/2013 | Walia et al. |
| 8,489,460 | B2 | 7/2013 | Kamath |
| 8,504,416 | B2 | 8/2013 | Calder et al. |
| 8,516,515 | B2 | 8/2013 | Zigmond et al. |
| 8,527,341 | B2 | 9/2013 | Feuerstein et al. |
| 8,527,342 | B2 | 9/2013 | Feuerstein et al. |
| 8,533,048 | B2 | 9/2013 | Charania |
| 8,533,049 | B2 | 9/2013 | Flake et al. |
| 8,539,067 | B2 | 9/2013 | Juda et al. |
| 8,539,072 | B1 | 9/2013 | Harrison |
| 8,554,619 | B2 | 10/2013 | Juda et al. |
| 8,560,385 | B2 | 10/2013 | Atazky et al. |
| 8,566,224 | B2 | 10/2013 | Walia et al. |
| 8,566,861 | B2 | 10/2013 | Zigmond et al. |
| 8,589,233 | B2 | 11/2013 | Flake et al. |
| 8,620,795 | B2 | 12/2013 | Veeraraghavan |
| 8,630,902 | B2 | 1/2014 | Baum et al. |
| 8,639,567 | B2 | 1/2014 | Winters |
| 8,645,186 | B2 | 2/2014 | Moukas et al. |
| 8,650,066 | B2 | 2/2014 | Shah et al. |
| 8,655,695 | B1 | 2/2014 | Qu et al. |
| 8,655,730 | B1 | 2/2014 | Swan et al. |
| 8,671,016 | B2 | 3/2014 | Little |
| 8,700,452 | B1 | 4/2014 | McKennon et al. |
| 8,700,462 | B2 | 4/2014 | Collins |
| 8,732,015 | B1 | 5/2014 | Beckerman et al. |
| 8,738,433 | B2 | 5/2014 | DiOrio et al. |
| 8,738,446 | B1 | 5/2014 | L'Heureux et al. |
| 8,744,908 | B2 | 6/2014 | Kalb et al. |
| 8,751,359 | B2 | 6/2014 | Walia et al. |
| 8,751,418 | B1 | 6/2014 | Sutter et al. |
| 8,752,086 | B2 | 6/2014 | Conant |
| 8,782,683 | B2 | 7/2014 | Balakrishnan et al. |
| 8,788,345 | B2 | 7/2014 | Kamath |
| 8,819,249 | B2 | 8/2014 | Harrison |
| 8,819,255 | B1 | 8/2014 | Harrison |
| 8,825,677 | B2 | 9/2014 | Gausebeck et al. |
| 8,831,987 | B2 | 9/2014 | Knapp et al. |
| 8,904,021 | B2 | 12/2014 | Harrison |
| 8,909,771 | B2 | 12/2014 | Heath |
| 8,935,721 | B2 | 1/2015 | Tidwell et al. |
| 8,949,890 | B2 | 2/2015 | Evans et al. |

(56) References Cited

U.S. PATENT DOCUMENTS

| | | | |
|---|---|---|---|
| 8,972,281 | B2 | 3/2015 | Pokonosky |
| 8,983,859 | B2 | 3/2015 | Nice et al. |
| 8,990,105 | B1 | 3/2015 | Shatkin-Margolis et al. |
| 9,026,886 | B1 | 5/2015 | Harrison |
| 9,053,497 | B2 | 6/2015 | Benyamin |
| 9,154,942 | B2 | 10/2015 | Harrison et al. |
| 9,167,419 | B2 | 10/2015 | Harrison |
| 2002/0072966 | A1 | 6/2002 | Eldering et al. |
| 2002/0184047 | A1 | 12/2002 | Plotnick et al. |
| 2005/0021397 | A1 | 1/2005 | Cui et al. |
| 2005/0137958 | A1 | 6/2005 | Huber et al. |
| 2006/0190330 | A1 | 8/2006 | Tollinger et al. |
| 2006/0217110 | A1 | 9/2006 | Othmer et al. |
| 2006/0253328 | A1 | 11/2006 | Kohli et al. |
| 2007/0038509 | A1 | 2/2007 | Jain et al. |
| 2007/0143186 | A1 | 6/2007 | Apple et al. |
| 2007/0169143 | A1 | 7/2007 | Li |
| 2007/0198355 | A1 | 8/2007 | Samson et al. |
| 2008/0167943 | A1 | 7/2008 | O'Neil et al. |
| 2008/0271070 | A1 | 10/2008 | Kanojia et al. |
| 2009/0037252 | A1 | 2/2009 | Joyce |
| 2009/0091571 | A1 | 4/2009 | Zalewski |
| 2009/0150215 | A1 | 6/2009 | Kalb et al. |
| 2009/0150224 | A1 | 6/2009 | Lu et al. |
| 2009/0171780 | A1 | 7/2009 | Aldrey |
| 2009/0172728 | A1 | 7/2009 | Shkedi |
| 2009/0199107 | A1 | 8/2009 | Lewis et al. |
| 2009/0248478 | A1 | 10/2009 | Duggal et al. |
| 2009/0248680 | A1* | 10/2009 | Kalavade ............ G06Q 30/0267 |
| 2009/0298480 | A1 | 12/2009 | Khambete et al. |
| 2010/0121671 | A1 | 5/2010 | Boutilier et al. |
| 2010/0191600 | A1 | 7/2010 | Sideman |
| 2010/0235219 | A1 | 9/2010 | Merrick et al. |
| 2010/0324982 | A1 | 12/2010 | Marolli |
| 2010/0324992 | A1 | 12/2010 | Birch |
| 2011/0035277 | A1 | 2/2011 | Kodialam et al. |
| 2011/0040611 | A1 | 2/2011 | Simmons et al. |
| 2011/0040612 | A1 | 2/2011 | Simmons et al. |
| 2011/0040613 | A1 | 2/2011 | Simmons et al. |
| 2011/0040635 | A1 | 2/2011 | Simmons et al. |
| 2011/0040636 | A1 | 2/2011 | Simmons et al. |
| 2011/0106618 | A1 | 5/2011 | Ben-Moshe |
| 2011/0119126 | A1 | 5/2011 | Park et al. |
| 2011/0119128 | A1 | 5/2011 | Fang et al. |
| 2011/0225037 | A1 | 9/2011 | Tunca et al. |
| 2011/0225604 | A1 | 9/2011 | Bova |
| 2011/0231242 | A1 | 9/2011 | Dilling et al. |
| 2011/0231243 | A1 | 9/2011 | Bhatia et al. |
| 2011/0231245 | A1 | 9/2011 | Bhatia et al. |
| 2011/0231246 | A1 | 9/2011 | Bhatia et al. |
| 2011/0231253 | A1 | 9/2011 | Crawford et al. |
| 2011/0231264 | A1 | 9/2011 | Dilling et al. |
| 2011/0238485 | A1 | 9/2011 | Haumont et al. |
| 2012/0022937 | A1 | 1/2012 | Bhatia et al. |
| 2012/0059713 | A1 | 3/2012 | Galas et al. |
| 2012/0089455 | A1 | 4/2012 | Belani et al. |
| 2012/0120250 | A1* | 5/2012 | Shintani ............ G06Q 30/0251 348/180 |
| 2012/0158485 | A1 | 6/2012 | Ogawa |
| 2012/0158486 | A1 | 6/2012 | Ogawa |
| 2012/0158487 | A1 | 6/2012 | Ogawa |
| 2012/0191529 | A1 | 7/2012 | Lewis et al. |
| 2012/0253928 | A1 | 10/2012 | Jackson et al. |
| 2012/0271708 | A1 | 10/2012 | Ogawa |
| 2012/0271709 | A1 | 10/2012 | Ogawa |
| 2012/0310745 | A1 | 12/2012 | Bhatia et al. |
| 2012/0323674 | A1 | 12/2012 | Simmons et al. |
| 2013/0054349 | A1 | 2/2013 | Ogawa |
| 2013/0124309 | A1 | 5/2013 | Traasdahl et al. |
| 2013/0205339 | A1 | 8/2013 | Haberman et al. |
| 2013/0262225 | A1 | 10/2013 | Ahrens et al. |
| 2014/0040008 | A1 | 2/2014 | Belani et al. |
| 2014/0046777 | A1 | 2/2014 | Markey et al. |
| 2014/0058826 | A1 | 2/2014 | Ogawa |
| 2014/0095320 | A1 | 4/2014 | Sivaramakrishnan et al. |
| 2014/0114773 | A1 | 4/2014 | Stukenborg et al. |
| 2014/0136338 | A1* | 5/2014 | Ringdahl ........... G06Q 30/0273 705/14.71 |
| 2014/0157309 | A1 | 6/2014 | Small et al. |
| 2014/0278981 | A1 | 9/2014 | Mersov et al. |
| 2014/0289765 | A1* | 9/2014 | Kitts ................. H04N 21/25866 725/35 |
| 2015/0025936 | A1* | 1/2015 | Garel ................. G06Q 30/0201 705/7.29 |
| 2015/0066662 | A1 | 3/2015 | Knapp et al. |
| 2015/0088635 | A1 | 3/2015 | Maycotte et al. |
| 2015/0112803 | A1* | 4/2015 | Heiser, II ........... G06Q 30/0255 705/14.53 |
| 2015/0121418 | A1 | 4/2015 | Jain et al. |
| 2015/0161186 | A1 | 6/2015 | Vemuri |
| 2015/0208110 | A1 | 7/2015 | Small et al. |
| 2015/0287097 | A1 | 10/2015 | Umeda |
| 2015/0350320 | A1* | 12/2015 | Yang .................... H04N 21/631 709/217 |
| 2016/0117718 | A1 | 4/2016 | Hood et al. |
| 2016/0119689 | A1 | 4/2016 | Hood et al. |
| 2016/0125461 | A1 | 5/2016 | Sivaramakrishnan et al. |
| 2017/0034592 | A1 | 2/2017 | Ray et al. |
| 2017/0034593 | A1 | 2/2017 | Ray et al. |
| 2017/0099525 | A1 | 4/2017 | Ray et al. |
| 2017/0142465 | A1 | 5/2017 | Ray et al. |
| 2017/0208370 | A1 | 7/2017 | Ray et al. |

OTHER PUBLICATIONS

PCT International Search Report, Application No. PCT/US16/43952 dated Oct. 6, 2016, 2 sheets.

PCT International Search Report, Application No. PCT/US16/43954 dated Dec. 12, 2016, 4 sheets.

PCT International Search Report, Application No. PCT/US16/43958 dated Nov. 29, 2016, 4 sheets.

PCT International Search Report, Application No. PCT/US16/43955 dated Nov. 29, 2016, 4 sheets.

PCT International Search Report, Application No. PCT/US17/15870 dated May 19, 2017, 2 sheets.

Non-Final Office Action dated Apr. 19, 2017 from the United States Patent and Trademark Office in U.S. Appl. No. 15/219,264.

Non-Final Office Action dated Jun. 1, 2017 from the United States Patent and Trademark Office in U.S. Appl. No. 15/219,262.

Non-Final Office Action dated Jun. 13, 2017 from the United States Patent and Trademark Office in U.S. Appl. No. 15/219,268.

Measuring Cross-Device, The Methodology, Tapad, whitepaper, Mar. 2017, available at https://www.tapad.com/resources/cross-device/measuring-cross-device-the-methodology (last accessed, Jul. 26, 2017).

Adap.tv Debuts Programmatic TV. Mar. 6, 2014. Wireless News. [retrieved on Sep. 22, 2016]. Retrieved from Proquest Technology Collection: <URL: http://search.proquest.com/docview/1504287899?accountid= 142944>.

Cross-Platform Future in Focus 2016, comScore, Inc., whitepaper, Mar. 2016, available at https://www.comscore.com/Insights/Presentations-and-Whitepapers/2016/2016-US-Cross-Platform-Future-in-Focus (last accessed Jul. 26, 2017).

Cross-Screen Planning Whitepaper, TubeMogul, Inc., 2016, available from https://www.tubemogul.com/ (last accessed, Jul. 26, 2017).

Programmatic Advertising Software. TubeMogul, Inc., Jul. 15, 2016, available from https://www.tubemogul.com/tubemogul-software/ (last accessed, Jul. 26, 2017).

How is Ad Inventory like Fruit?, Brightroll, Inc., Jun. 29, 2016, available at https://brightroll.com/insights/how-ad-inventory-fruit (last accessed, Jul. 26, 2017).

Drawbridge Connected Consumer Graph, 2016, available at https://drawbridge.com/c/graph (last accessed, Jul. 26, 2017).

Freewheel Video Monetization Report, 2016, Q2. Available at http://freewheel.tv/freewheel-views/a-peek-inside-the-freewheel-video-monetization-report-q2-2016/ (last accessed, Jul. 26, 2017).

(56) References Cited

OTHER PUBLICATIONS

The Device Graph, Tapad, available at htttps://www.tapad.com/device-graph, (last accessed, Jul. 26, 2017).

* cited by examiner

TARGETING TV ADVERTISING SLOTS BASED ON CONSUMER ONLINE BEHAVIOR

CLAIM OF PRIORITY

This application claims the benefit of priority under 35 U.S.C. § 119(e) to U.S. provisional application Ser. No. 62/196,637, filed Jul. 24, 2015, and 62/317,440, filed Apr. 1, 2016, both of which are incorporated herein by reference in their entirety.

RELATED APPLICATIONS

This application is related to U.S. patent application Ser. No. 15/219,262, filed Jul. 25, 2016, entitled "CROSS-SCREEN OPTIMIZATION OF ADVERTISING PLACEMENT", Ser. No. 15/219,268, filed Jul. 25, 2016, entitled "CROSS-SCREEN MEASUREMENT ACCURACY IN ADVERTISING PERFORMANCE", Ser. No. 15/219,264, filed Jul. 25, 2016, entitled "SEQUENTIAL DELIVERY OF ADVERTISING CONTENT ACROSS MEDIA DEVICES", and to provisional application Ser. No. 62/196,618, filed Jul. 24, 2015, 62/196,898, filed Jul. 24, 2015, 62/196,592, filed Jul. 24, 2015, 62/196,560, filed Jul. 24, 2015, 62/264,764, filed Dec. 8, 2015, 62/278,888, filed Jan. 14, 2016, and 62/290,387, filed Feb. 2, 2016, all of which are incorporated herein by reference in their entirety.

TECHNICAL FIELD

The technology described herein generally relates to effective matching of advertising content to receptive viewers of TV programs on TV and other devices based on data about the viewers' online viewing habits, and more particularly relates to methods of bidding for advertising inventory on programmatic TV devices.

BACKGROUND

Video advertisements are among the most advanced, complicated, and expensive, forms of advertising content. Beyond the costs to produce video content itself, the expense of delivering video content over the broadcast and cable networks remains considerable, in part because television (TV) slots are premium advertising space in today's economy. Furthermore, TV is no longer a monolithic segment of the media market, and viewing data for TV content is tracked in a number of different ways. Consumers can now spread their viewing of video content, particularly premium content, across traditional TV, DVR, and a menagerie of over-the-top and on-demand video services viewed across smart TVs, gaming consoles, and mobile devices, as well as traditional TVs.

In short, TV viewing is transforming to digitally distributed viewing, as audiences watch proportionately less live broadcasting and more in a video on demand (VOD) or streaming video format.

Adding online consumption to the list of options available to any given consumer, only lends greater complexity to the process of coordinating delivery of video adverts to a relevant segment of the public. This complexity means that the task of optimizing delivery of advertising content today far exceeds what has traditionally been necessary, and what has previously been within the capability of experienced persons. The data needed to fully understand a given consumer is fragmented as each individual and household views more and more media in a disparate fashion by accessing a network of devices. In short, today's complexities require specifically tailored technological solutions, and take the decision making out of the hands of skilled people by utilizing computer methods that are able to handle a large number of factors, and at a speed, that humans could not possibly cope with. For example, human analysts have guided, and in some situations continue to guide, the selection of advertising inventory based on, for example, spreadsheets and other static data management tools designed for the desktop. But this results in low selection efficiency and delays in responding to market trends. Such methods are also incapable of quickly and accurately integrating information about how consumers behave across all of their devices.

Consequently, there are many important considerations that influence an advertiser's selection of advertising inventories and the type of content to deliver. The considerations include factors such as: time of day the advertisement will play, desired number of impressions, type of audience the advertiser wishes to reach, and the price of the advertising time slot.

Nevertheless, advertisers are heavily dependent on information they receive from media conduits and panel based data providers for assistance in deciding where and when content should be delivered, as well as assessing effectiveness of that delivery when making decisions on subsequent strategies. The decisions of how to deliver content, and what form that content takes, are particularly influenced by information about the viewing data made available by the content providers. For example, content providers can inform advertisers which demographic groups are likely viewers of a given program, according to time of day and program content. However, today's rich media environment demands attention to more factors when deciding when to deliver advertising content and to which devices.

Furthermore, in the context of today's advertising, it is both important but difficult to be nimble and flexible in content delivery: an advertiser wants to be able to react quickly to changes in market conditions or to specific occurrences such as a news development or a big sporting event; an advertiser also wants to act on an appreciation that an initial strategy is not optimal, as well as to capitalize on the consumer's access to many different viewing platforms.

Additionally, media conduits are effectively siloed and produce an environment in which it is not possible to coordinate an advertising campaign across both television media and digital video platforms at the same time. Often, advertisers deploy different teams and tools for each conduit. For example, Internet companies Google and Facebook are considered as media conduits because they have their own platforms for broadcasting content to a dedicated population of consumers. Each such company limits exchange of data to within their own properties. Similarly, an advertiser cannot easily coordinate delivery of content between, a social media network such as Facebook, and a TV content provider such as DirecTV. Consequently, many advertising agencies divide their campaign budgets between TV and online delivery.

However, combining data across content owners, devices, and media formats today is costly, impracticable, and in some cases unlawful due to government privacy regulations. Given these restrictions, advertising inventory purchasing today relies largely on limited data models that imperfectly pair advertising to market segment targets.

Therefore, it has not been possible with today's tools to track exactly which person has watched a particular advertisement because it is not possible to aggregate information from all the available media conduits on which that individual might have viewed content.

Most TV advertising buying decisions are based off of panel data for targeted audiences (such as that provided by Nielsen), which by definition involves polling a fixed group of consumers that have been selected by the ratings companies to be representative of the population at large. Human panelists report the TV content they have seen. Then statistical models on sample data and reporting metrics are produced to extrapolate to regional or national viewership trends and behaviors from the models. For example, advertisers receive data from TV panel companies (ratings agencies), and use the information to decide how they are going to design and implement an advertising campaign. Separately, online viewership data can be tracked by content providers such as Comcast, Netflix and YouTube. So, alternatively, the advertisers will receive data from online panels such as Comscore, Nielsen and Kantar, which track where the audience is online. Cable operators also sell their own viewership data from their subscribers. But these various sources are analyzed by advertisers and brand managers independently of one another. An additional drawback of panel-based models is their reliance on a fixed and relatively small number of parameters to characterize the viewing public.

While informational tools today are able to quantify viewer participation by calculating views per media device or provider, and infer, based on available census data, which types of individuals are likely to view an advertisement, the ability to aggregate exact viewer behavior across multiple media conduits has not been possible to do with useful accuracy or speed. As such, advertisers anticipate that in order to reach the desired audience, they will need to repeatedly play the same short clip either across many media conduits or target a selection of popular media conduits for multiple successive broadcasts of the same content or non-redundant versions of it. But the challenge of anticipating which viewers will actually view the content a certain number of times (frequency) remains.

Assessing whether a user has viewed TV delivered content has historically been challenging because it is difficult to establish whether a person actually watched the show or segment as it was being broadcast.

The advent of "Smart TV's" (also known as connected TV's) such as those manufactured by OEMs such as Samsung, LG, and Vizio has, however, provided more reliable means of measuring this data because Smart TV's allow consumers to opt into online connectivity of their TV sets. The TV's are connected to the internet as well as a feed from, say, a cable company, and so they send a data feed of programs being viewed on a particular TV, in real-time via the internet.

Data from Smart-TV's can be used to produce measurements that are at least as informative as those relied on by Nielsen, and offer the prospect of being superior for a number of reasons: the data that can be received from a SmartTV is richer than a simple yes/no response to whether a given viewer watched a particular program; there are many more SmartTV's in circulation than even the largest panels deployed by ratings companies, and that number continues to increase over time; and SmartTV data can potentially be linked to other data about a given consumer. This means that it no longer makes sense to rely on an old-fashioned technique that relies on a panel of consumers to validate a model.

Nevertheless, online media distributors such as Google don't have data from SmartTV's. Given this, the state of the art in advertising strategies differs across different media. For example, digital advertising is able to target based on known online behaviors, whereas TV advertising strategy is based on census data and is focused on reaching particular demographics. Furthermore, although data driven and automated TV advertising known as Programmatic TV (PTV) advertisement spending now constitutes 7% of all TV advertising spend, and is doubling every year, there remain differences between the feedback time for purchasing decisions in the TV realm from those relating to online content. Thus, it would additionally be useful to have in place bidding methods for purchasing advertising inventory that are tailored to programmatic TV content so that advertisers can reliably reach the growing segment of the population for which data is known via programmatic TV viewing.

Given the absence of more complex consumer classifications, predicting the behavior of consumers using available statistical methods can be ineffective. Consumer classification data is core to the decision making process for advertisers and brand managers when purchasing advertising inventory.

Pairing viewer TV behavior to online viewership data is not currently practiced. Panel data alone hasn't allowed analysts the ability to gather aggregated consumer behavior, and analyze it on a person-to-person basis. Today, the availability of unique user behavior can be better understood if aggregated across devices and media providers. However, privacy laws restrict the ability to commercialize, collect or share personally identifying user data collected from media, device and service operators. It is also unlawful in some instances to aggregate data that is protected by privacy laws. Thus, the intelligence that can be gained from that data must not include information relating back to consumer identities due to the risk of unlawful disclosure. Using identification hashing protects user privacy while permitting data aggregation, but current methods do not provide advertising buying platforms the ability to quickly and securely hash identities effectively.

There is therefore a need for a system to offer a unified purchasing experience for video advertising inventory and one that can reliably target relevant populations of consumers.

The discussion of the background herein is included to explain the context of the technology. This is not to be taken as an admission that any of the material referred to was published, known, or part of the common general knowledge as at the priority date of any of the claims found appended hereto.

Throughout the description and claims of the application the word "comprise" and variations thereof, such as "comprising" and "comprises", is not intended to exclude other additives, components, integers or steps.

SUMMARY

The instant disclosure addresses the processing of consumer and advertising inventory in connection with optimizing placement of advertising content across display devices. In particular, the disclosure comprises methods for doing the same, carried out by a computer or network of computers. The disclosure further comprises a computing apparatus for performing the methods, and computer readable media having instructions for the same. The apparatus and process of the present disclosure are particularly applicable to video content in online and TV media.

The methods herein use consumers' data on behaviors and types from online (obtained by, for example, direct measurement), as a basis for purchasing targeted TV inventory.

By mapping data, without any requirement for an optimization, such as a constrained optimization, or a fitting, it is possible to make reasonable deductions about potential audience constituents. For example, 6 million users can be identified from online usage; of these, 2 million have smart TV's. The TV viewership data for those 2 million can be retrieved, from which it is possible to see which TV shows are best targeted with advertising content. This method addresses a limitation that it is currently not possible to do consumer-level advertisement targeting of TV content. But if high concentrations of promising TV viewers can be identified, then there can be benefits for the advertiser.

The use of deep learning methodology, as described herein, enables an understanding of the relationships between pieces of content.

The technology includes method that bridges the gap between online and offline video advert buys through its ability to graph connections among individuals and elements of video content.

The technology includes a media-buying platform that bridges the gap between online and offline video strategies by combining the targeting and reporting capabilities of digital with offline strategies.

The technology herein links media consumption to individual profiles, and offers advertisers a path to navigate between online and TV consumer data.

A problem in the art is that information received from TV's and cable companies is only about what programs are being viewed, and does not contain information about demographics. By coupling information obtained from online and views of other digital content, with TV viewing data, it is possible to produce as output a selection of TV programs that is watched or is likely to be watched by a given segment of the population based on their online viewing behavior.

The technology herein further includes a method for identity hashing in the indexing of digital advertising with market segments. Within a TV/OTT/VOD advertising buying platform, buyers select TV/OTT/VOD inventory (i.e., programs and airing content) that matches targeted market segments. Buyers select from a list of available market segments, and the system and methods herein pair the user-selections to an anonymous dataset of media consumers (with hashed online IDs) within the processing environment (the platform provider's servers).

The hashed online IDs are then mapped to external OEM IDs (such as Samsung's online user IDs and the like) via the platform's identity hashing methods. The targeted market segment can be derived from online data sources such as third party social media data, third party online purchase history, third party back link history, third party link history, first party acquired cookie data, and other opted in internet behavior data, which includes, browsing, social media content, purchases.

The method permits the anonymous pairing or market segment descriptions with actual online viewers without exposing identities or IP addresses to any end-user or first party platform provider. End-users such as media planners, advertising agencies, TV advertisers, and the like are shielded from unwanted exposure to market segment target identities and identifying metadata. Likewise, the system stores and processes hashed identities, such that advertising inventory may be purchased, such as bid on, without exposing the identities of viewers.

The present disclosure further provides for a method for targeting a population of TV viewers to which to deliver advertising content, the method comprising: receiving programmatic TV data for a first population of consumers, wherein the programmatic TV data comprises at least one IP address and a list of TV viewing data for each TV accessible to a consumer in the first population of consumers; de-identifying the IP address for each TV, thereby creating a hash-ID for each TV that is associated with each consumer in the first population of consumers; associating the hash-ID for each TV with a consumer identifier in a graph of consumer data, wherein the graph of consumer data is constructed from online behavioral and demographic data on a second population of consumers; identifying one or more slots of TV advertising inventory based on one or more demographic factors of consumers in the second population of consumers and the list of TV viewing data associated with those consumers; purchasing a slot of TV advertising inventory relevant to the second population of consumers; and instructing a media conduit to deliver an item of advertising content to the second population of consumers in the one or more slots of inventory. Typically, the first population is ultimately a subset of second population, though it may not be at first.

The present disclosure further includes a computer readable media, encoded with instructions for carrying out methods described herein and for processing by one or more suitably configured computer processors.

The present disclosure additionally includes a computing apparatus configured to execute instructions, such as stored on a computer readable medium, for carrying out methods described herein.

BRIEF DESCRIPTION OF THE DRAWINGS

Like reference symbols in the various drawings indicate like elements.

DETAILED DESCRIPTION

The instant technology is directed to computer systems and methods that can allow an advertiser to target advertising content to a population of TV viewers, based on program viewing behavior deduced from a combination of TV viewing data from TV stations and smart-TV's with online and demographic data obtained from one or both of first parties and third parties. The data is combined in such a way that personally identifiable information is protected and not shared between the various sources of data.

Advertising Functions

Figure 1:
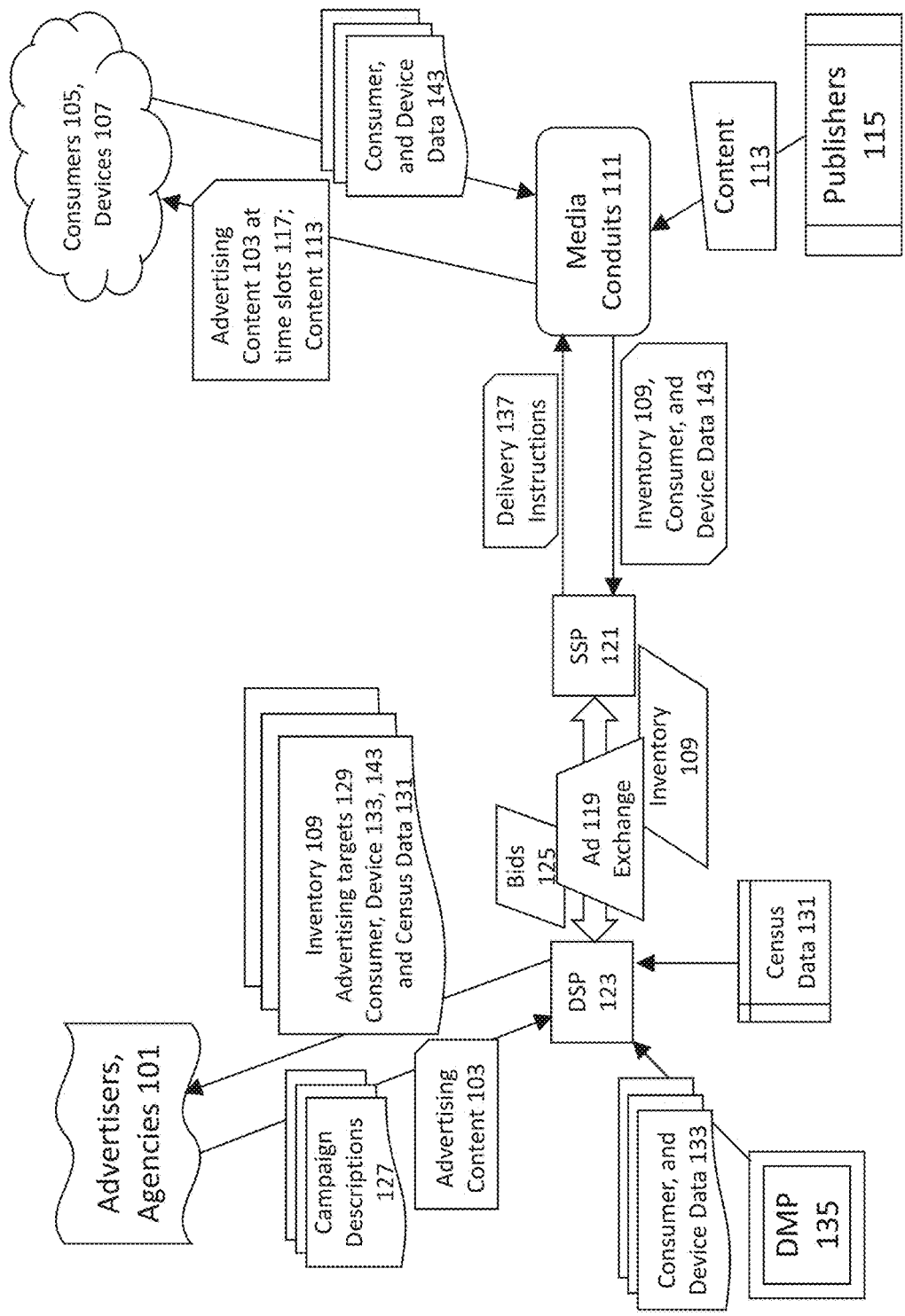
FIG. 1 shows, diagrammatically, relationships between parties that contribute to delivery of advertising content, such as advertisers, an advertising exchange, media conduits, and consumers.

Relationships between entities in the business of purchase, delivery and consumption of advertising content are depicted in FIG. 1. As can be seen, the advertising ecosystem is complex, involves many different entities, and many different relationships.

An advertiser 101 is a purchaser of advertising inventory 109. An advertiser may be a corporation that exercises direct control over its advertising functions, or it may be an agency that manages advertising requirements of one or more clients, usually corporate entities. The advertiser intends to make advertising content 103 (also an "advertisement" herein) available to one or more, typically a population of, consumers 105, on one or more devices 107 per consumer.

Devices 107 include, for a given consumer, one or more of: TV's (including SmartTV's), mobile devices (cell phones, smartphones, media players, tablets, notebook computers, laptop computers, and wearables), desktop computers, networked photo frames, set top boxes, gaming consoles, streaming devices, and devices considered to function within the "Internet of Things" such as domestic appliances (fridges, etc.), and other networked in-home monitoring devices such as thermostats and alarm systems.

The advertising content 103 has typically been created by the advertiser 101 or a third party with whom the advertiser has contracted, and normally includes video, audio, and/or still images that seek to promote sales or consumer awareness of a particular product or service. Advertising content 103 is typically delivered to consumers via one or more intermediary parties, as further described herein.

Advertising content is typically of two different types: branding, and direct-response marketing. The timeframe is different for these two types. Branding promotes awareness; direct response marketing is designed to generate an immediate response. For example, an automobile manufacturer may put out direct response marketing material into the market place, and wants to measure responses by who went to a dealership or website after seeing an advertisement. The methods herein can be applied to both types of advertising content, but the measurement of effectiveness is different for the two types: for example, effectiveness of branding is measured by GRP's (further described elsewhere herein), and results of direct response marketing can be measured by, for example, website visits.

When delivered to a mobile device such as a phone or a tablet, advertising content 103 may additionally or alternatively take the form of a text/SMS message, an e-mail, or a notification such as an alert, a banner, or a badge. When delivered to a desktop computer or a laptop computer or a tablet, the advertising content 103 may display as a pop-up within an app or a browser window, or may be a video designed to be played while other requested video content is downloading or buffering.

Consumers 105 are viewers and potential viewers of the advertising content 103 and may have previously purchased the product or service that is being advertised, and may—advantageously to the advertiser—be learning of the product or service for the first time when they view the advertising content 103.

Advertising inventory 109 (also inventory or available inventory, herein) comprises available slots, or time slots 117, for advertising across the several media interfaces, or conduits 111, through which consumers access information and advertising content. Such media interfaces include TV, radio, social media (for example, online networks, such as LinkedIN, Twitter, Facebook), digital bill boards, mobile apps, and the like. Media conduits 111 may generate their own content 113, or may be broadcasting content from one or more other content providers or publishers 115. For example, a cable company is a media conduit that delivers content from numerous TV channel producers and publishers of content. Media interfaces may also be referred to as content providers, generally, because they deliver media content 113 (TV programs, movies, etc.) to consumers 105. One aspect of the technology herein includes the ability to aggregate inventory 109 from more than one type of media interface or content provider. Media conduits 111 also deliver advertising content 103 that has been purchased for delivery at time slots 117, to consumers 105 for viewing on various devices 107. A publisher 115 is typically a content owner (e.g., BBC, ESPN).

A slot 117 is a time, typically expressed as a window of time (1 minute, 2 minutes, etc.) at a particular time of day (noon, 4:30 pm, etc., or a window such as 2-4 pm, or 9 pm-12 am), or during a specified broadcast such as a TV program, on a particular broadcast channel (such as a TV station, or a social media feed). An available slot is a slot in the inventory that an advertiser may purchase for the purpose of delivering advertising content. Typically it is available because another advertiser has not yet purchased it. As further described herein, a slot may additionally be defined by certain constraints such as whether a particular type of advertising content 103 can be delivered in a particular slot. For example, a sports equipment manufacturer may have purchased a particular slot, defined by a particular time of day on a particular channel, and may have also purchased the right to exclude other sports equipment manufacturers from purchasing slots on the same channel within a certain boundary—in time—of the first manufacturer's slot. In this context, a "hard constraint" is a legal or otherwise mandatory limitation on placing advertising in particular time slots or within specified media. A "soft constraint" refers to desired (non-mandatory) limitations on placing advertising in particular time slots within specified media. "Constraint satisfaction" refers to the process of finding a solution to a set of constraints that impose conditions that the variables must satisfy. The solution therefore is a set of values for the variables that satisfies all constraints.

Information is intended to mean, broadly, any content that a consumer can view, read, listen to, or any combination of the same, and which is made available on a screen such as a TV screen, computer screen, or display of a mobile device such as a tablet, smart-phone, or laptop/notebook computer, a wearable such as a smart-watch, fitness monitor, or an in-car or in-plane display screen. Information is provided by a media interface 111 such as a TV or radio station, a multi-channel video programming distributor (MVPD, such as a cable TV provider, e.g., Comcast), or an online network such as Yahoo! or Facebook.

VOD refers to video on demand systems, which allow users to select and watch or listen to video or audio content when they choose to, rather than having to watch content at a scheduled broadcast time. Internet technology is often used to bring video on demand to televisions and personal computers. Television VOD systems can either stream content through a set-top box, a computer or other device, allowing viewing in real time, or download it to a device such as a computer, digital video recorder (also called a personal video recorder) or portable media player for viewing at any time.

The communication between the advertisers and the media conduits can be managed by up to several entities, including: a demand-side provider (DSP) 123, an advertising exchange 119, and a supply-side provider 121. An advertising exchange 119 (also, exchange herein) is an environment in which advertisers can bid on available media inventory. The inventory may be digital such as via online delivery over the Internet, or via digital radio such as SiriusXM, or may be analog, such as via a TV channel such as ESPN, CNN, Fox, or BBC, or an FM/AM radio broadcast. An advertising exchange 119 typically specializes in certain kinds of content. For example, SpotX specializes in digital content, WideOrbit specializes in programmatic TV.

Supply-side provider (SSP) 121 is an intermediary that takes inventory 109 from a media conduit 111, and makes it available to a demand-side provider (DSP) 123, optionally via exchange 119, so that advertisers can purchase or bid on the inventory when deciding how to position advertising content 103. SSP's have sometimes been categorized as public or private depending on whether a media conduit is able to limit the identity and number of advertisers who have access to the inventory. In some situations, an SSP interacts directly with a DSP without the need for an advertising exchange; this is true if the functions of an advertising exchange that a purchaser of advertising content relies on are performed by one or both of the DSP and SSP. The technology herein is particularly suited for being implemented and being carried out by a suitably-configured DSP.

In one configuration, an advertising exchange 119 interfaces between a supply side provider (SSP) 121 and a demand side provider (DSP) 123. The interfacing role comprises receiving inventory 109 from one or more SSP's 121 and making it available to the DSP, then receiving bids 125 on that inventory from the DSP and providing those bids 125 to the SSP. Thus, a DSP makes it possible for an advertiser to bid on inventory provided by a particular SSP such as SPotX, or WideOrbit. In some configurations, the DSP takes on most or all of the role of an advertising exchange.

In one embodiment of the technology herein, a DSP provides a schedule for an advertising campaign, which, if approved by the advertiser, the DSP has to purchase on its behalf and arrange for the execution of the campaign. The SSP controls delivery of the advertising content to the media conduits.

An advertising campaign (or campaign) is a plan, by an advertiser, to deliver advertising content to a particular population of consumers. A campaign will typically include a selection of advertising content (such as a particular advertisement or various forms of an advertisement, or a sequence of related advertisements intended to be viewed in a particular order), as well as a period of time for which the campaign is to run (such as 1 week, 1 month, 3 months). An advertiser typically transmits a campaign description 127 to an advertising exchange 119 or a DSP 121, and in return receives a list of the inventory 109 available. A campaign description 127 may comprise a single item of advertising content 103 and one or more categories of device 107 to target, or may comprise a schedule for sequential delivery of two or more items of advertising content 103 across one or more devices 107. A campaign description 127 may also comprise a description of a target audience, wherein the target audience is defined by one or more demographic factors selected from, but not limited to: age range, gender, income, and location.

The DSP 123 then provides an interface by which the advertiser 101 can align its campaign descriptions 127 against inventory 109 and purchase, or bid on, various slots 117 in the inventory. The DSP 123, or an exchange 119, may be able to provide more than one set of inventory that matches a given campaign description 127: each set of inventory that matches a given campaign description is referred to herein as an advertising target 129. The advertiser 101 may select from among a list of advertising targets, the target or targets that it wishes to purchase. Once it has purchased a particular target, the SSP 121 is notified and delivery instructions 137 are sent to the various media conduits 111 so that the advertising content 103 can be delivered in the applicable time slots 117, or during selected content 113, to the relevant consumers.

A purchase of a given slot is not simply a straightforward sale at a given price, but is achieved via a bidding process. The DSP will place bids on a number of slots, and for each one, will have identified a bid price that is submitted to the SSP. For a winning bid, the SSP delivers the advertising content to the media conduit, and ultimately the consumer. Bids are generally higher for specific targeting than for blanket targeting.

The bidding process depends in part on the type of advertising content. TV content can be scheduled in advance, whereas for online content, the typical bid structure is 'just-in-time' bidding: the advert is delivered only if a particular consumer is seen online. In general, the methods herein are independent of bidding process, and are applicable to any of the bidding methods typically deployed, including real-time-bidding, as well as bidding that exploits details of programmatic TV data.

By serving a tag with a given online ad, by using a protocol such as VPAID (https://en.wikipedia.org/wiki/Mixpo) or VAST (video advert serving template, http://www.iab.com/guidelines/digital-video-ad-serving-template-vast-compliance/), the tag collects data including whether a consumer clicked on, or viewed, the content. The tag typically contains a number of items of data relating to how a consumer interacted with the advertising content. The items of data can be returned to the SSP and/or the DSP in order to provide feedback on the circumstances of delivery of the advertisement. For example, the items of data can include a datum relating to whether a user clicked on a video online. Certain items of data correspond to events that are referred to in the industry as "beacon" events because of their salience to an advertiser: for example a beacon event can include the fact that a user stopped a video segment before it completed.

The process of generating advertising targets may also depend one or more campaign requirements. A campaign requirement, as used herein, refers to financial constraints such as a budget, and performance specifications such as a number of consumers to target, set by an advertiser or other purchaser of advertising inventory. Campaign requirement information is used along with campaign descriptions when purchasing or bidding on inventory.

DSP's 123 also provide advertisers 101 with data on consumers and devices, aggregated from various sources. This data helps an advertiser choose from the inventory, those time slots and media conduits that will best suit its goals.

Data used by DSP's may include census data 131, or data on specific consumers and devices 133. Census data 131 includes data on a population that can be used to optimize purchase of inventory. Census data 131 can therefore include demographic data such as age distribution, income variations, and marital status, among a population in a particular viewing region independent of what media interfaces the members of the population actually view. Census data 131 can be aggregated from a variety of sources, such as state and county records, and U.S. Census Bureau data.

A data management platform (DMP) 135 can provide other types of third party data 133 regarding consumers and the devices they use to the DSP. Typically a DMP provides a data warehousing facilities with embedded functionality. DMPs download data and can perform a variety of analytical functions ranging from sorting, storing, processing, applying matching algorithms, and providing data outputs to purchasers and subscribers. Examples of DMP's include: Krux, Exelate, Nielsen, Lotame. The consumer and device data 133 that is delivered to a DSP from a third party provider may complement other consumer and device data 143 that is provided by the media conduits. Data on consumers and the devices they use that is relevant to an advertiser includes matters of viewing habits as well as specific behavioral data that can be retrieved directly from a media conduit. For example, as further discussed elsewhere herein, when a media conduit serves an advertisement to a consumer, the conduit can collect information on that user's manner of access to the advert. Due to the volume of data involved, after a relatively short period of time, such as 14 days, a media conduit may not be able to furnish any information on a particular consumer. In that instance, the DSP can get data on that user from a third party such as a DMP. Third parties can get data offline as well. As used herein, an offline event is one that happens independently of the Internet or a TV view: for example, it can include purchase of an item from a store and other types of location-based events that an advertiser can view as significant. Data can be shared between the entities herein (e.g., between a DMP and a DSP, and between DSP and SSP, and between media conduits and a SSP or advertising exchange) using any commonly accepted file formats for sharing and transfer of data: these formats include, but are not limited to: JSON, CSV, and Thrift, as well as any manner of text file appropriately formatted.

An impression refers to any instance in which an advertisement reaches a consumer. On a TV, it is assumed that if the TV is broadcasting the advertisement then an individual known to be the owner of, or a regular viewer of, that TV will have been exposed to the advertisement, and that display counts as an impression. If multiple persons are in the same household then the number of impressions may equal the number of persons who can view that TV. In the online environment, an impression occurs if a consumer is viewing, say, a web-page and the advertisement is displayed on that web-page such as in the form of a pop-up, or if the user has clicked on a link which causes the advertisement to run.

An audience segment is a list of consumers, de-identified from their personally identifiable information using cookie syncing or other methods, where the consumers belong to a type (income, gender, geographic location, etc.), or are associated with a behavior: purchases, TV viewership, site visits, etc.

Cookie syncing refers to a process that allows data exchange between DMP's SSP's and DSP's, and more generally between publishers of content and advertisement buyers. A cookie is a file that a mobile device or desktop computer uses to retain and restore information about a particular user or device. The information in a cookie is typically protected so that only an entity that created the cookie can subsequently retrieve the information from it. Cookie syncing is a way in which one entity can obtain information about a consumer from the cookie created by another entity, without necessarily obtaining the exact identify of the consumer. Thus, given information about a particular consumer received from a media conduit, through cookie syncing it is possible to add further information about that consumer from a DMP.

For mobile devices, there is a device ID, unique to a particular device. For Smart TV's there is a hashed IP address. The device ID information may be used to link a group of devices to a particular consumer, as well as link a number of consumers, for example in a given household, to a particular device. A DSP may gather a store of data, built up over time, in conjunction with mobile device ID's and TV addresses that augment 'cookie' data.

Cross-screen refers to distribution of media data, including advertising content, across multiple devices of a given consumer, such as a TV screen, computer screen, or display of a mobile device such as a tablet, smart-phone or laptop/notebook computer, a wearable such as a smart-watch or fitness monitor, or an in-car, or in-plane display screen, or a display on a networked domestic appliance such as a refrigerator.

Reach is the total number of different people exposed to an advertisement, at least once, during a given period.

In a cross-screen advertising or media campaign, the same consumer can be exposed to an advertisement multiple times, through different devices (such as TV, desktop or mobile) that the consumer uses. Deduplicated reach is the number of different people exposed to an advertisement irrespective of the device. For example, if a particular consumer has seen an advertisement on his/her TV, desktop and one or more mobile devices, that consumer only contributes 1 to the reach.

The incremental reach is the additional deduplicated reach for a campaign, over and above the reach achieved before starting the campaign, such as from a prior campaign. In one embodiment herein, a type of campaign can include a TV extension: in this circumstance, an advertiser has already run a campaign on TV, but is reaching a point of diminished returns. The advertiser wants to find ways to modify the campaign plan for a digital market, in order to increase the reach. In this way, a DSP may inherit a campaign that has already run its course on one or more media conduits.

In addition to TV programming content, and online content delivered to desktop computers and mobile devices, advertisements may be delivered within OTT content. OTT (which derives from the term "over the top") refers to the delivery of audio and video, over the Internet without the involvement of a MVPD in the control or distribution of the content. Thus, OTT content is anything not tied to particular box or device. For example, Netflix, or HBO-Go, deliver OTT content because a consumer doesn't need a specific device to view the content. By contrast, MVPD content such as delivered to a cable or set top box is controlled by a cable or satellite provider such as Comcast, AT&T or DirecTV, and is not described as OTT. OTT in particular refers to content that arrives from a third party, such as Sling TV, YuppTV, Amazon Instant Video, Mobibase, Dramatize, Presto, DramaFever, Crackle, HBO, Hulu, myTV, Netflix, Now TV, Qello, RPI TV, Viewster, WhereverTV, Crunchyroll or WWE Network, and is delivered to an end-user device, leaving the Internet service provider (ISP) with only the role of transporting IP packets.

Furthermore, an OTT device is any device that is connected to the internet and that can access a multitude of content. For example, Xbox, Roku, Tivo, Hulu (and other devices that can run on top of cable), a desktop computer, and a smart TV, are examples of OTT devices.

Gross rating point (GRP) refers to the size of an advertising campaign according to schedule and media conduits involved, and is given by the number of impressions per member of the target audience, expressed as a percentage (GRP can therefore be a number >100. For example, if an advert reaches 30% of the population of L.A. 4 times, the GRP is 120. (The data may be measured by, e.g., a Nielsen panel of say 1,000 viewers in L.A.).

The target rating point (TRP) refers to the number of impressions per target audience member, based on a sample population. This number relates to individuals: e.g., within L.A. the advertiser wants to target males, 25 and older. If there are 100 such persons in the L.A. panel and 70% saw the ad., then the TRP is 70%×number of views.

Real-time refers to real-time computing, and is defined as a computing system that can receive and process data, and return analyzed results sufficiently rapidly (such as within a matter of seconds) that it effectively does not cause delay to a party who relies upon the results for decision-making purposes. It is to be assumed that the processes for allowing an advertiser to select, bid on, and purchase advertising inventory, as described herein, can be carried out in real-time.

"Device Graph" refers to the association of users with devices on which they consume media.

Delivering and Optimizing Cross-Screen Advertising Content

The technology described herein permits an advertiser to target advertising content to a consumer across more than one media conduit, including both TV and online media. There are two types of environment in which an advertiser can target a consumer. In a 1:1 environment, a DSP can just use the actual segment and/or a modeled out version of the actual segment, to make a real time decision to place the advert if the consumer matches the targeting parameters. In an index approach, when it is not possible to target 1:1 and it is not possible to do dynamic advert insertion or real time decisioning, the system instead looks at concentration of viewers projected to access the slot (such as a TV program or VOD program) and then targets the slots that have the highest concentration of the target consumers.

In a preferred embodiment, the advertiser has control over the allocation of the advertising content because the advertiser accesses the system via a unified interface that presents information about inventory, manages bids on the inventory, and provides a list of potential advertising targets consistent with a campaign description and the advertiser's budget. The system then communicates with, for example, supply-side providers to ensure that the desired slots are purchased, typically via a bidding process, and the advertising content is delivered or caused to be delivered.

Consumer Data

Data about consumers can be categorized into two groups: there are non-transmutable characteristics such as ethnicity, and gender; and there are transmutable characteristics such as age, profession, address, marital status, income, taste and preferences. Various transmutable characteristics such as profession are subject to change at any time, while others such as age change at a consistence rate. Today, the data systems that track consumer information for use in targeting advertising content lack the ability to broadly track both categories of consumer data. Most data systems contain static, homogenous classifications of consumers. For example, a 29-year old who bought a car two years ago will be a consumer data point that will not be updated or augmented with time. Even if the age of the individual as stored in a system can be adjusted with time, other transmutable characteristics such as change in marital state, or lifestyle changes, are not taken into account in this consumer's classification.

Identifying TV Viewing Data

The technology described herein permits an advertiser to target advertising content to a consumer across more than one media conduit, including both TV and online media. There are two types of environment in which an advertiser can target a consumer. In a 1:1 environment, a DSP can just use the actual segment and/or a modeled out version of the actual segment, to make a real time decision to place the advert if the consumer matches the targeting parameters. In an index approach, when it is not possible to target 1:1 and it is not possible to do dynamic advert insertion or real time decisioning, the system instead looks at concentration of viewers projected to access the slot (such as a TV program or VOD program) and then targets the slots that have the highest concentration of the target consumers.

Figure 2:
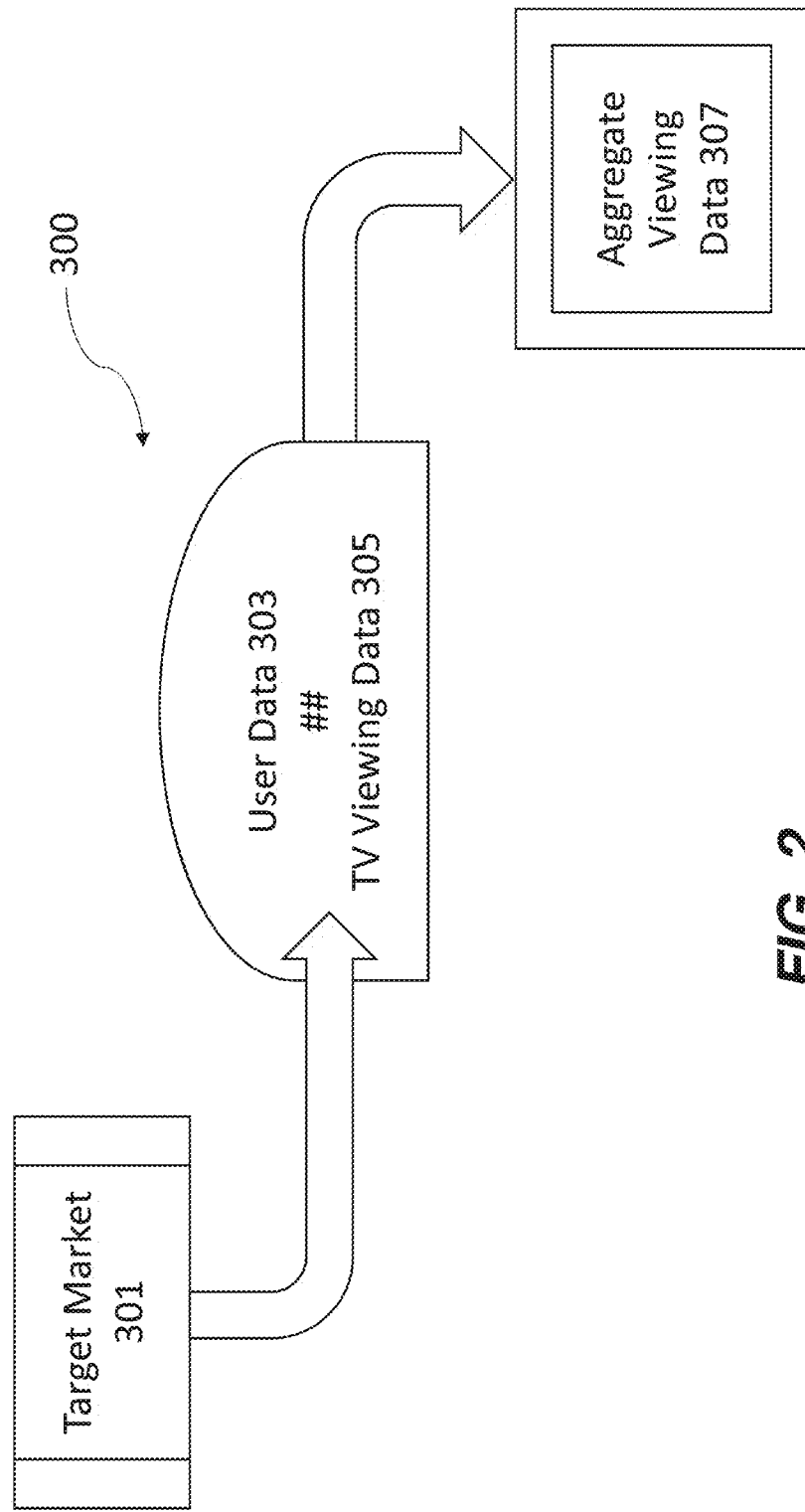
FIG. 2 shows an overview of the information utilized to assist a purchaser of advertising to identify spots in a TV market.

FIG. 2 illustrates an overview of operation of the methods 300 herein from the perspective of an end-user such as an advertiser. The methods are preferably performed on or by a DSP, or an advertising exchange. In one embodiment there is an interface through which an advertiser can choose attributes of a target market 301, such as location, age, income level, gender, from a list of available of target market data. Once chosen, these attributes can be matched against a database of paired user data, comprising data 303 for consumers obtained from online viewer data, and TV viewing data 305 can then be deduced. The consumer and TV viewing data can be hashed to protect individual user identities, by other methods herein. The connection between the two sets of data can be made because a given consumer identified from online data can be mapped to a particular set of TV viewing data.

The advertiser receives aggregated viewing data 307 of the selected target market, which may comprise a list of TV programs during which to schedule advertising content. These are a concentration of TV programs that are likely to be viewed by members of the target market.

At various stages of the methods herein, it is described that each consumer in a population of consumers is treated in a particular way by the method: for example, a computer may be programmed to analyze data on each consumer in its database in order to ascertain which, if any, have viewed a particular TV show, or visited a particular website; alternatively, some comparative analysis may be performed, in which attributes of each user in one category of population is compared with attributes of each consumer in another category of population. Each population set may comprise many thousands of individuals, or many hundreds of thousands, or even millions or many millions of individuals. It is assumed herein that the methods, when deployed on suitable computing resources, are capable of carrying out stated calculations and manipulations on each and every member of the populations in question. However, it is also consistent with the methods herein that "each consumer" in a population may also mean most consumers in the population, or all consumers in the population for whom the stated calculation is feasible. For example, where one or more given consumers in a population is omitted from a particular calculation because there is insufficient data on the individual, that does not mean that an insufficient number of members of the population is analyzed in order to provide a meaningful outcome of the calculation. Thus "each" when referencing a population of potentially millions of consumers does not necessarily mean exactly every member of the population but may mean a large and practically reasonable number of members of the population, which for the purposes of a given calculation is sufficient.

Consumer Graph

A consumer graph is a graph in which each node represents a consumer (or individual user). The technology utilizes various implementations of a weighted graph representation in which relationships between consumers (nodes) are defined as degrees of similarity (edges). A consumer graph is used herein to categorize, store, and aggregate large amounts of non-personally identifiable consumer data, and allow an entity such as a DSP to make connections between data used to build a consumer graph with other data—such as TV viewing data—via data on given consumers' devices. An advantage of the consumer graph herein is that it is constructed from a potentially unlimited number of input parameters. By expanding the amount of data under consideration beyond a fixed number of attributes of a consumer base (age, income, gender, etc.) to use of behavioral data (such as specific viewing and purchasing histories of individual consumers, as well as demographic, and location-related sources) that is continually being updated, the comparisons between consumers can be much more sophisticated.

One way to construct the graph is by using deterministic relationship data; another is probabilistically using the attributes of each node. In some instances, a combination of deterministic and probabilistic methods can be used. In a deterministic, approach, which is relatively straightforward, the basis is having exact data on a consumer, such as login information from a publisher. Thus, if a person has logged in multiple times on different devices with the same ID, then it is possible to be sure that the person's identity is matched. However, such exact information may not always be available. By contrast, in a probabilistic approach, it is necessary to draw inferences: for example, if the same device is seen in the same location, or similar behavior can be attributed to a given device at different times, then it possible to conclude that the device belongs to the same user.

In some embodiments herein, machine learning methods, and Bayesian and regression algorithms, are used to explore commonalities between consumers. Such methods are useful in situations where there is a finite number of parameters to be considered. In some other embodiments, techniques of deep learning are more useful in finding consumer similarities and constructing a consumer graph. Machine learning is a preferred technique for matching exact pieces of information, for example whether the same websites have been visited by two consumers, but deep learning can explore the details of a particular video or TV program—for example, by analyzing natural scene statistics—and thereby ascertain, for example, whether two adverts that were viewed by a given consumer have something in common beyond their subject matter. For example, two adverts may include the same actor and be liked by a consumer for that reason, even though the products portrayed have little in common.

In preferred embodiments, the device graph herein is based on probabilistic data. The probabilistic approach to graph construction uses behavioral data to match up users.

In some embodiments, an entity such as a DSP, can construct a device graph; in other embodiments it can obtain, such as purchase, a graph from another entity such as a DMP, though when purchased, the graph is preferably augmented according to the methods herein.

In various embodiments herein, both a device graph and a consumer graph are operating together in a manner that permits tying in mobile data to TV data.

Figure 3:
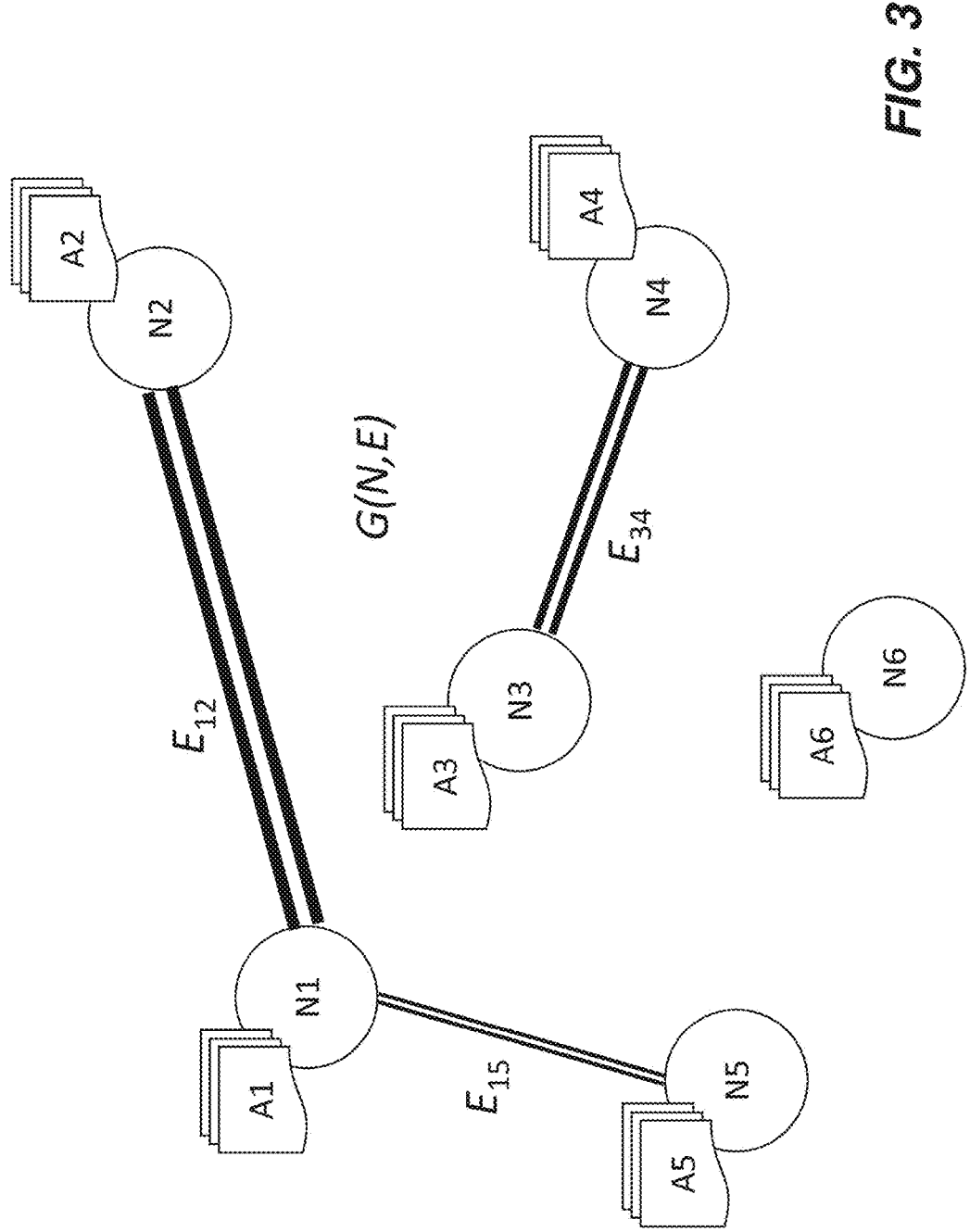
FIG. 3 shows a consumer graph.

The term graph is used herein in its mathematical sense, as a set G (N, E) of nodes (N) and edges (E) connecting pairs of nodes. Graph G is a representation of the relationships between the nodes: two nodes that are connected by an edge are similar to one another according to some criterion, and the weight of an edge defines the strength of the similarity. Pairs of nodes that do not meet the similarity criterion are not joined by an edge. FIG. 3 illustrates graph concepts, showing 6 nodes, $N_1$-$N_6$, in which three pairs of nodes are connected by edges.

In the implementation of a graph herein, a node, N, is an entity or object with a collection of attributes, A. In FIG. 3, each node has associated with it an array of attributes, denoted Ai for node Ni.

In the implementation of a graph herein, an edge, E, existing between two nodes indicates the existence of a relationship, or level of similarity, between the two nodes that is above a defined threshold. The weight of an edge, w_E, is the degree of similarity of the two nodes. The weights of the edges in FIG. 3 are shown diagrammatically as thicknesses (in which case, $w\_E_{12} > w\_E_{34} > w\_E_{15}$).

In a consumer graph, a node represents an individual, or a household comprising two or more individuals, with a set of attributes such as the gender(s) and age(s) of the individual(s), history of TV programs watched, web-sites visited, etc.

Figure 4:
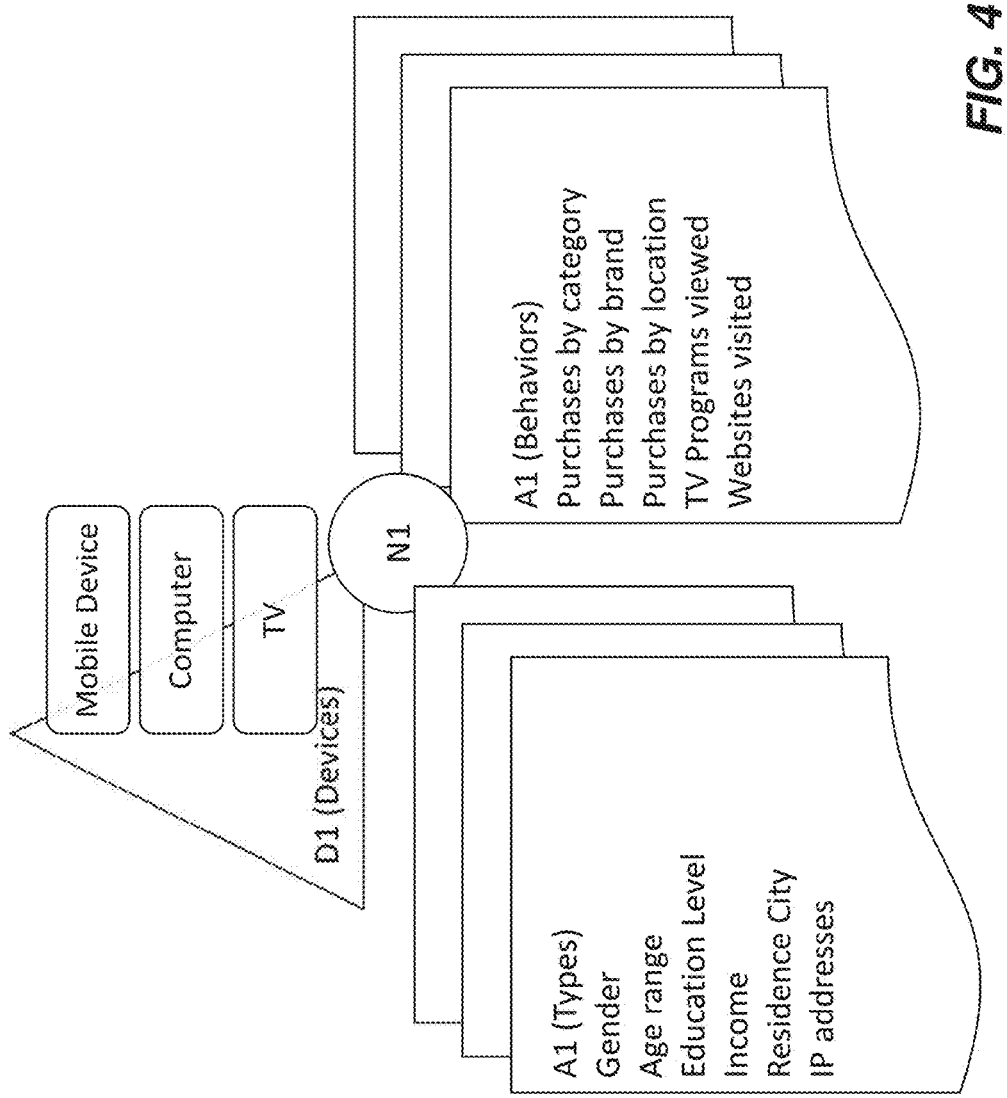
FIG. 4 shows a node in a graph.

FIG. 4 illustrates an exemplary structure of a node of a consumer graph. Each node has a collection of attributes that include types and behaviors, for which data is continuously collected from first party and third party sources. Many of the attributes are transmutable if new information for the consumer becomes available, and the collection of attributes (i.e., the number of different attributes stored for a given consumer) can also grow over time as new data is collected about the consumer. This permits an advertiser to tailor and adjust their campaign during its period of operation. An aspect of the technology herein is that the graph is constructed from a potentially unlimited number of inputs for a given consumer, such as online, offline, behavioral, and demographic data. Those inputs are updated over time and allow the data for a given consumer to be refined, as well as allow the population of consumers on which data can be used to be expanded. The fact that there is no limit to the type and character of data that can be employed means that the methods herein are superior to those employed by panel companies, which rely on static datasets and fixed populations.

Some of the sources from which data is collected are as follows.

Type data is categorical data about a consumer that normally does not change, i.e., is immutable. Behavioral data is continuously updated based on a consumer's recent activity.

Each node includes a grouping of one or more devices (desktop, mobile, tablets, smart TV). For each device, data on the type of the user based on the device is collected from third party and first party sources.

Table 1 shows examples of data by category and source.

TABLE 1

|  | 1$^{st}$ Party | 3$^{rd}$ Party |
| --- | --- | --- |
| Non-transmutable |  | Census (Govt.) Household income Education level (e.g., from Excelate) |

TABLE 1-continued

| | 1st Party | 3rd Party |
|---|---|---|
| Trans-mutable | Behavior (online) TV viewing Viewability (how much of advert is seen, kept on, visible online?) Online sites visited Location events | Gender (e.g., from Nielsen, DAR) Offline Behavior Retail Purchases Offsite visits (visited pharmacy, movie theater, car dealership, etc.) |

First party data comprises data on a user's behavior, for example: purchases, viewership, site visits, etc., as well as types such as income, gender, provided directly by a publisher to improve targeting and reporting on their own campaigns. (For example, the Coca Cola company might provide to a DSP, a list of users who "like" Coke products on social media to improve their video advertising campaigns.) First party type data can be collected from advertisements served directly to the device, and from information collected from the device, such as one or more IP addresses. First party type data includes location from IP address, geolocation from mobile devices, and whether the device is located in a commercial or residential property.

Third party type data is obtained from external vendors. Through a one-on-one cookie synchronization or a device synchronization, an external vendor, for example a DMP such as Krux (http://www.krux.com/), Experian (which provides purchase behavior data), or Adobe, provides information about the cookie or device. Example data includes market segment occupied by the consumer, such as age range, gender, income level, education level, political affiliation, and preferences such as which brands the consumer likes or follows on social media. Additionally, external vendors can provide type data based on recent purchases attributed to the device. Third party data includes information such as gender and income because it is not collected directly from external vendors. Third party data can be collected without serving an advertisement. TV programs viewed and purchases are third party data.

First Party data is typically generated by a DSP; for example, it is data that the DSP can collect from serving an advert or a Brand/Agency that provides the data. First party data includes data that depends on having served an advert to have access to it.

Behavioral data can be collected from the devices through first party and third party sources. Behaviors are first party data typically and are mutable.

First party behavioral data is collected from advertisements served directly to the device. This includes websites visited, and the TV program, or OTT, or video on demand (VOD) content viewed by the device.

Third party behavioral data is obtained from external vendors, typically DMP's such as Experian, Krux, Adobe, Nielsen and Comscore, and advertising exchanges or networks, such as Brightroll, SpotX, FreeWheel, Hulu. Example data includes the history of TV programming viewed on the device in the last month, the history of websites visited by a personal computer or laptop, or mobile device, and history of location based events from mobile devices (for example, whether the device was at a Starbucks). In some instances, the same types of data can be obtained from both first party and third party entities.

Edges between the nodes in the consumer graph signify that the consumers have a threshold similarity, or interact with each other. The edges can be calculated deterministically, for example, if the nodes are in physical proximity, or probabilistically based on similarity in attributes. Probabilistic methods utilized include, but are not limited to: K-means clustering, and connected components analysis (which is based on graph traversal methods involving constructing a path across the graph, from one vertex to another. Since the attributes are transmutable, the edges can also change, either in their weighting or by being created or abolished if the similarity score for a pair of nodes alters. Thus the graph is not static, and can change over time. In some embodiments, change is dynamic: similarity scores are continually recalculated as nodes attributes for nodes are updated.

Typically, attributes and data are added dynamically (as they are obtained). The graph may be re-constructed weekly to take account of the new attributes and data, thereby establishing new weightings for the edges, and identifying newly connected or reconnected devices. (Graph construction and reconstruction may be done in the "cloud", i.e., by distributing the calculations over many processors on a computer network, or on processors warehoused at a datacenter under the control of the DSP.)

The similarity, S, between two nodes $N\_1$, $N\_2$, is calculated according to a similarity metric, which is the inverse of a distance function, $f(N\_1, N\_2)$: $N\_1, N\_2 \rightarrow S$, that defines the similarity of two nodes based on their attributes.

In a consumer graph, similarity represents the likeness of two individuals in terms of their demographic attributes and their viewing preferences. Similarities can be calculated, attribute by attribute, and then the individual similarity attributes weighted and combined together to produce an overall similarity score for a pair of nodes.

When the attributes of two nodes are represented by binary vectors, there are a number of metrics that can be used to define a similarity between a pair of nodes based on that attribute. Any one of these metrics is suitable for use with the technology herein. In some embodiments, for efficiency of storage, a binary vector can be represented as a bit-string, or an array of bit-strings.

When working with a similarity metric that is the inverse of a distance function, $f(N\_i, N\_j)$, a zero value of the distance function signifies that the types and behaviors of the two nodes are identical. Conversely, a large value of the distance function signifies that the two nodes are dissimilar. An example of a distance function is Euclidean distance, $$f(N\_i, N\_j) = \|A\_i - A\_j\|^2$$

where $A\_i$, and $A\_j$ are the sparse vectors representing the attributes of nodes $N\_i$ and $N\_j$, and the distance is computed as a sum of the squares of the differences of in the values of corresponding components of each vector.

Comparisons of binary vectors or bit-strings can be accomplished according to one or more of several similarity metrics, of which the most popular is the Tanimoto coefficient. Other popular metrics include, but are not limited to: Cosine, Dice, Euclidean, Manhattan, city block, Euclidean, Hamming, and Tversky. Another distance metric that can be used is the LDA (latent Dirichlet allocation). Another way of defining a distance comparison is via a deep learning embedding, in which it is possible to learn the best form of the distance metric instead of fixing it as, e.g., the cosine distance. An example approach is via manifold learning.

The cosine dot product is a preferred metric that can be used to define a similarity between the two nodes in a consumer graph. The cosine similarity, that is the dot product of A_i and A_j, is given by:

$$f(N\_i, N\_j) = A\_i \cdot A\_j$$

In this instance, the vectors are each normalized so that their magnitudes are 1.0. A value of 1.0 for the cosine similarity metric indicates two nodes that are identical. Conversely, the nearer to 0.0 is the value of the cosine metric, the more dissimilar are the two nodes. The cosine metric can be converted into a distance-like quantity by subtracting its value from 1.0:

$$f(N\_i, N\_j) = 1 - A\_i \cdot A\_j$$

An example of a more complex distance function is a parameterized Kernel, such as a radial basis function.

$$f(N\_i, N\_j) = \exp(\|A\_i - A\_j\|^2 / s^2),$$

where s is a parameter.

In the more general case in which the bit-string is a vector that contains numbers other than 1 and 0 (for example it contains percentages or non-normalized data), then one can calculate similarity based on distance metrics between vectors of numbers. Other metrics, such as the Mahalanobis distance, may then be applicable.

Typically, a similarity score, S, is a number between 0 and 100, though other normalization schemes could be used, such as a number between 0 and 1.0, a number between 0 and 10, or a number between 0 and 1,000. It is also possible that a scoring system could be un-normalized, and simply be expressed as a number proportional to the calculated similarity between two consumers.

In some embodiments, when calculating a similarity score, each contributing factor can be weighted by a coefficient that expresses the relative importance of the factor. For example, a person's gender can be given a higher weighting than whether they watched a particular TV show. The weightings can be initially set by application of heuristics, and can ultimately be derived from a statistical analysis of advertising campaign efficacy that is continually updated over time. Other methods of deriving a weighting coefficient used to determine the contribution of a particular attribute to the similarity score include: regression, or feature selection such as least absolute shrinkage and selection operator ("LASSO"). Alternatively, it is possible to fit to "ground truth data", e.g., login data. In some embodiments, as the system tries different combinations or features, which one leads to greater precision/recall can be deduced by using a "held out" test data set (where that feature is not used in construction of the graph).

Another way of deriving a similarity score for a feature is to analyze data from a successive comparison of advertising campaigns to consumer feedback using a method selected from: machine learning; neural networks and other multi-layer perceptrons; support vector machines; principal components analysis; Bayesian classifiers; Fisher Discriminants; Linear Discriminants; Maximum Likelihood Estimation; Least squares estimation; Logistic Regressions; Gaussian Mixture Models; Genetic Algorithms; Simulated Annealing; Decision Trees; Projective Likelihood; k-Nearest Neighbor; Function Discriminant Analysis; Predictive Learning via Rule Ensembles; Natural Language Processing, State Machines; Rule Systems; Probabilistic Models; Expectation-Maximization; and Hidden and maximum entropy Markov models. Each of these methods can assess the relevance of a given attribute of a consumer for purposes of suitability for measuring effectiveness of an advertising campaign, and provide a quantitative weighting of each.

Representation

To properly assess an entire population of consumers, a large number of nodes needs to be stored. Additionally, the collection of attributes that represent a node's types and behaviors can be sizeable. Storing the collection of the large number of attributes for the nodes is challenging, since the number of nodes can be as many as hundreds of millions. Storing the data efficiently is also important since the graph computations can be done most quickly and efficiently if the node data is stored in memory.

In a preferred embodiment, attributes are represented by sparse vectors. In order to accomplish such a representation, the union of all possible node attributes for a given type is stored in a dictionary. Then the type, or behavior, for each node is represented as a binary sparse vector, where 1 and 0 represent the presence and absence of an attribute, respectively. Since the number of possible attributes of a given type is very large, most of the entries will be 0 for a given consumer. Thus it is only necessary to store the addresses of those attributes that are non zero, and each sparse vector can be stored efficiently, typically in less than $1/100^{th}$ of the space that would be occupied by the full vector.

As an example, let the attributes encode the TV programs that a given consumer has viewed in the last month. The system enumerates all possible TV shows in the dictionary, which can be up to 100,000 different shows. For each node, whether the consumer watched the show in the last month is indicated with a 1, and a 0 otherwise.

If the attributes indicate different income levels, multiple income levels are enumerated, and a 1 represents that the consumer belongs to a particular income level (and all other entries are 0).

Thus for a consumer, i, having an annual income in the range $30,000-$60,000, and who has viewed "Top Gear" in the last month, the following is established:

TV_Dictionary={"Walking Dead","Game of Thrones", . . . ,"Top Gear"}

TV_i=[0,0, . . . ,1]

TV_i can be stored as simply [4]; only the 4th element of the vector is non-zero. Similarly, for income:

Income_Dictionary={<$30,000,$30,000-$60,000,$60,000-$100,000,>$100,000}

Income_i=[0,1,0,0]

Income_i can be stored as simply [2], as only the second element of the vector is non-zero.

All the attributes of a node, i, can thus be efficiently represented with sparse vectors. This requires 2 to 3 orders of magnitude less memory than a dense representation.

Graph Construction

Figure 5A:
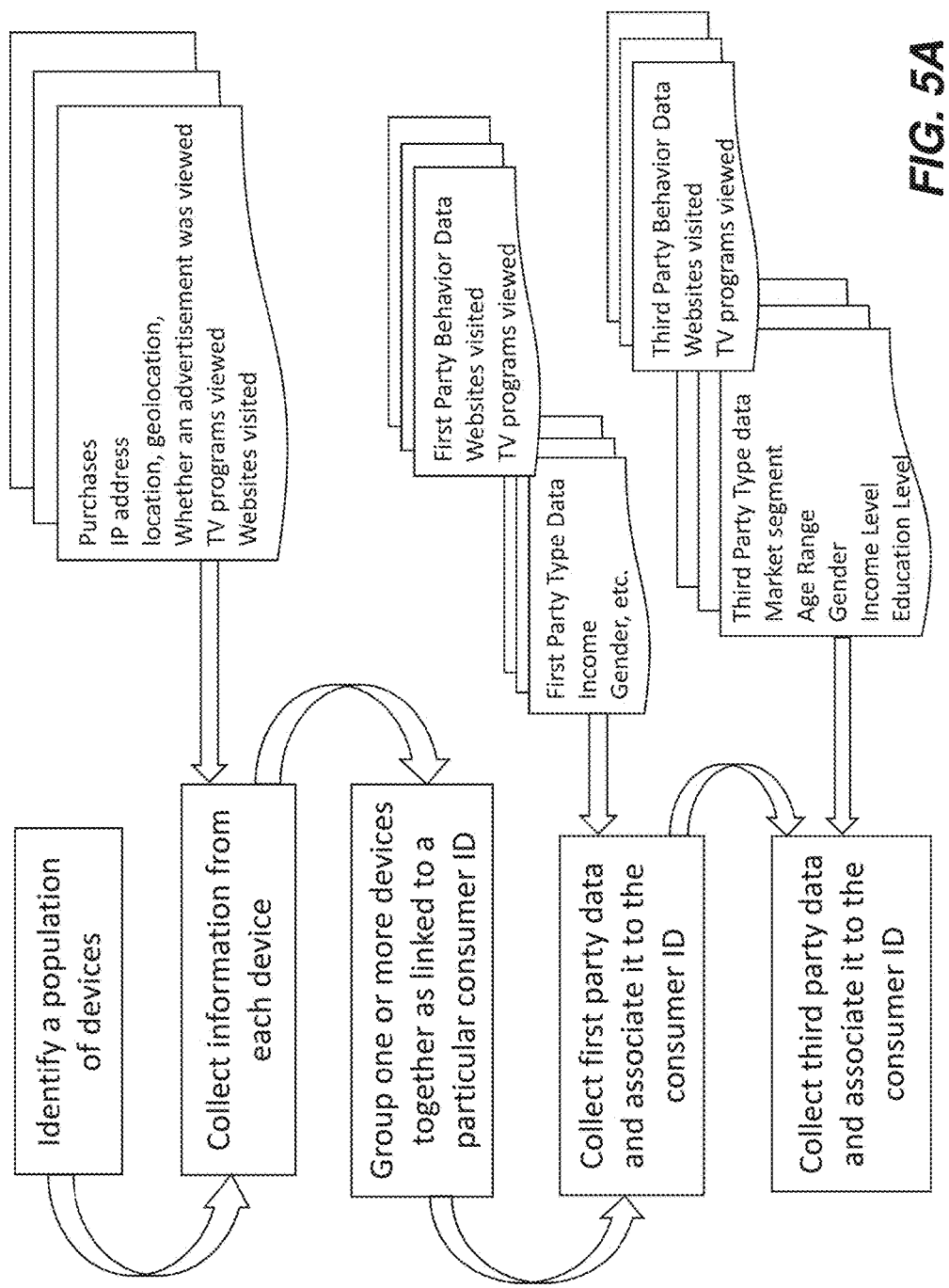
FIGS. 5A and 5B show steps in creation of a consumer graph.
Figure 5B:
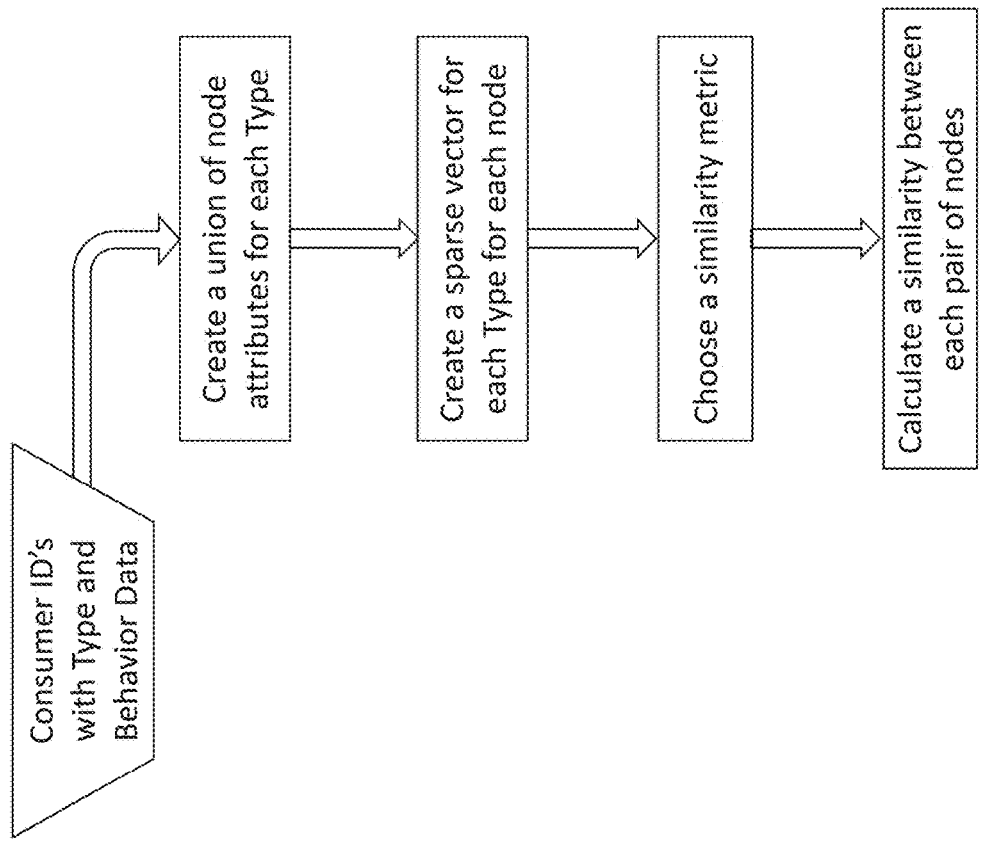

FIGS. 5A and 5B illustrate a flow-chart for steps in construction of a consumer graph.

Initially, the graph is a collection of devices, which are mapped to consumers. Multiple data sources are used to group multiple devices (tablet, mobile, TV, etc.) to a single consumer. This typically utilizes agglomerative techniques. In order to attribute a single device (e.g., a Smart TV) to multiple consumers, a refinement technique is used.

With agglomerative methods, multiple devices can be grouped to a single consumer (or graph node). Some data sources used for this include, but are not limited to:

IP addresses: multiple devices belonging to same IP address indicates a single consumer or a household.

Geolocation: multiple devices that are nearby, using latitude and longitude, can be attributed to a single consumer.

Publisher logins: if the same consumer is logged in from multiple devices, those devices can be associated with that consumer.

During this process, the consumer's identity is masked, to obviate privacy concerns. The result is a single consumer ID that links particular devices together.

Let $P(d\_i, d\_j)$ be the probability that the two devices, $d\_i$ and $d\_j$, belong to the same node (consumer, or household). From multiple datasets obtained from different categories of device, it is possible to construct the probability:

$$P(d\_i,d\_j)=w\_IP \times P(d\_i,d\_j|IP) \times w\_Geo \times P(d\_i,d\_j|Geo) \times w\_Login \times P(d\_i,d\_j|Login)/Z$$

where "X" means "multiply", where $w\_$ are weighting factors, $P(d\_i, d\_j|Y)$ is a conditional probability (the probability of observing device i and device j belong to same user, if Y has the same value for both, and Z is a normalizing factor. Thus, Y may be an IP address. (The value of the conditional probability may be 0.80). Each data source gets a different weighing factor: for example, login data can be weighted higher than IP addresses. The weights can be fixed, or learned from an independent validation dataset.

Once multiple devices are grouped to a single node, the Types and Behaviors from the respective devices are aggregated to the singular node's attributes. For example, attributes (and the corresponding sparse vectors) from mobile (such as location events), and desktop (recent purchases) are aggregated. This provides more comprehensive information for a consumer, permitting more accurate and meaningful inferences for a node to be made.

Associating a device with a given consumer is possible due to the data that is associated with those devices and known to various media conduits. For examples, a Smart-TV stores location information as well as subscription information about the content broadcast by it. This information is shared with, and can be obtained from, other entities such as a cable company. Similarly, a mobile device such as a tablet or smartphone may be associated with the same (in-home) wifi network as the Smart-TV. Information about the location is therefore shared with, e.g., the cell-phone carrier, as well as broadcasters of subscription content to the mobile device. A key aspect of the graph methodology herein is that it permits consumer information to be linked across different device and media platforms that have typically been segregated from one another: in particular, the graph herein is able to link consumer data from online and offline purchasing and viewing sources with TV viewing data.

With refinement methods, a single device (for example, a smart TV) can be associated with multiple consumers (or graph nodes) who, for example, own mobile devices that are connected to the same wifi network as the smart-TV.

Given a node, n, to which are assigned multiple devices, the various attributes are clustered into smaller groups of devices, for example, a TV ID, connected to multiple devices from a common IP address. The TV viewership data is aggregated along with the attributes from all the devices. A clustering algorithm, such as k-means clustering, can be applied to group the devices into smaller clusters. The number of clusters, k, can be set generally by the number of devices (by default k=# number of devices/4). Sometimes it is possible to only collect aggregate data at a household level. For example, there may be as many as 20 devices in one household. But by using behavioral data, it can be ascertained that the 20 devices have 4 major clusters, say with 5 devices each, where the clusters correspond to different individuals within the same household. Thus, although there are two categories of device (shared and personal), it is still important to attribute behavioral data to users.

Once a shared device is attributed to multiple nodes, the data collected from the device can be attributed to the nodes. For example, TV viewing data from a Smart TV can be collected from the OEM. Through this attribution, the TV viewing data can be added to the collection of a node's attributes. Ultimately, a Smart-TV can be attributed to different persons in the same household.

Lookalike Modeling by Learning Distance Functions

Given a graph, $G(N, E)$, and a functional form that defines a similarity metric, and a set of seed nodes, it is possible to generate a set of "lookalike" nodes that are similar to the seed nodes, where similarity is defined by a function that is fixed, or learned. This is useful when identifying new consumers who may be interested in the same or similar content as a group of consumers already known to an advertiser. Similar principles can be utilized when projecting likely viewing behavior of consumers from historical data on a population of consumers.

Seed nodes can be a set of nodes, e.g., household(s) or individual(s), from which to generate a set of lookalike nodes using a fixed, or learned, similarity metric. For example, seed nodes can be defined as an audience segment (such as list of users that saw a specific show for certain). This is useful for determining, for each member of the audience segment, a list of other audience members who might have similar viewing habits even if they did not watch exactly the same show as the seeds.

Given the set of seed nodes in a graph (and their attributes), the output of lookalike modeling is a set of nodes (that includes the seed nodes) that are similar to the seed nodes based on the fixed or learned similarity metric.

Several different vectors can be used in determining look-alike models: One is the vector of TV programs in total. This vector can be as long as 40 k elements. Another vector is the list of consumers who saw a particular program (e.g., The Simpsons). The vector of viewers for a given TV program can be as long as 10M elements, because it contains one element per consumer. Another vector would be a vector of web-sites visited (say 100 k elements long). Still another vector would be based on online videos viewed (which can also be 100 k elements long).

In general, TV program comparison data accesses a 10M user base. Online data can identify a potentially much larger audience, such as 150M consumers. It should be understood that TV data can be accumulated across a variety of TV consumption devices that include, but are not limited to linear, time-shifted, traditional and programmatic.

The similarity between 2 distinct nodes can be calculated from their attributes, represented by sparse vectors. Given a distance function $f(N\_i, N\_j)$, and a set of seed nodes, $N\_S$, the pairwise distances between each element of the seed nodes, n in $N\_S$, and all other nodes other than the seed node, n', are calculated. That is, all quantities $f(n, n')$ are calculated.

After calculating all pairwise similarities, only the nodes such that $f(n, n') < T$ are selected. T is a threshold maximum distance below which the nodes are deemed to be similar. Alternatively, values of $f(n, n')$ (where n is not n') are ranked in decreasing order, and the top t node pairs are selected. In either case, T and t are parameters that are preset (provided to the method), or learned from ground truth or validation data. The set of all nodes n' that satisfy the criteria above, form the set of "lookalike nodes".

Graph Inference

Given a graph G(N, E), it is also possible to infer likely attributes of a node, n, based on the attributes of its neighbors in the graph. This can be useful when incomplete information exists for a given consumer but where enough exists from which inferences can be drawn. For example, TV viewership attributes may be missing for a node n (in general, there is either positive information if a user did watch a show, or it is unknown whether they watched it), whereas those attributes are available for neighbor nodes n', n" in the graph. Nodes n, n', and n" contain all other attributes, such as income level and websites visited.

In another example, it can be useful to calculate the probability that the consumer associated with node n would watch the show "Walking Dead", given that n', n" both also watch "Walking Dead". If the similarity, given by the weight of the edges between n and n', n", are w', w"=0.8 and 0.9 respectively, and the likelihood of n watching the show based on his/her own attributes is 0.9, then the probability is given by:

$$P(n \text{ watches "Walking Dead"})=[0.8\times0.9+0.9\times0.9]/[0.8\times0.9+0.9\times0.9+(1-0.8\times0.9)+(1-0.9\times0.9)]=0.765$$

Similar principles can be utilized when projecting likely viewing behavior of consumers from historical data on a population of consumers.

Accuracy

The graph is continually refined as new data is received. In one embodiment, a technique such as machine learning is used to improve the quality of graph over time. This may be done at periodic intervals, for example at a weekly build stage. It is consistent with the methods herein that the graph utilized is updated frequently as new consumer data becomes available. This permits an advertiser to readily adjust its campaign as new data is received.

To determine the accuracy of a graph, the precision and recall can be compared against a validation dataset. The validation dataset is typically a (sub)graph where the device and node relationships are known with certainty. For example, the login information from an online network such as eHarmony, indicates when the same user has logged into the site from different desktops (office, laptop), and mobile devices (smartphone and tablet). All the devices that are frequently used to login to the site are thus tied to the same consumer and thereby that individual's graph node. This information can be used to validate whether the constructed graph ties those devices to the same node.

If D is the set of devices in the validation set, let Z(D) denote the graph, consisting of a set of nodes, constructed from the set of devices, D. For different datasets, and different graph construction methods, it is possible to obtain different results for Z(D).

For the set Z(D), true positive (TP), false positive (FP), and false negative (FN) rates can all be calculated. True positives are all nodes in Z(D) that are also nodes in the validation set. False positives are all nodes in N(D) that do not belong to the set of nodes in the validation set. False negatives are all nodes that belong to the validation set, but do not belong to Z(D).

Precision, defined as TP/(TP+FP), is the fraction of retrieved devices that are correctly grouped as consumer nodes.

Recall, defined as TP/(TP+FN), is the fraction of the consumer nodes that are correctly grouped.

Depending on the application at hand, there are different tradeoffs between precision and recall. In the case of constructing a consumer graph, it is preferable to obtain both high precision and high recall rates that can be used to compare different consumer graphs.

The validation dataset must not have been used in the construction of the graph itself because, by doing so, bias is introduced into the precision and recall values.

Learning the Similarity Metric:

Another feature of the graph that can be adjusted as more data is introduced is the underlying similarity metric. Typically, the metric is fixed for long periods of time, say 5-10 iterations of the graph, and the metric is not reassessed at the same frequency as the accuracy.

In the case where the distance function is not fixed, it is possible to learn the parameters of a particular distance function, or to choose the best distance function from a family of such functions. In order to learn the distance function or its parameters, the values of precision and recall are compared against a validation set.

Suppose a goal is to predict the lookalike audience segment that are high income earners, based on the attributes of a seed set of known high income earners. The similarity of the seed nodes to all other nodes in the graph is calculated for different distance functions, or parameters of a particular distance function. The distance function uses the attributes of the nodes, such as online and TV viewership, to calculate the similarities.

For example, if the distance function is the radial basis function with parameter, s:

$$f(N\_i,N\_j)=\exp(\|A\_i-A\_j\|^2/s^2),$$

then the pairwise distances from the seed nodes to all other nodes, are calculated for different values of s, using the same threshold distance value, T, to generate the set of lookalike nodes. For different values of s (the parameter that needs to be learned), the calculations produce different sets of lookalike nodes, denoted by N_S(s).

For the set N_S(s), it is possible to calculate true positive (TP), false positive (FP) and false negative (FN) rates. True positives are all nodes in N_S(s) that also belong to the target set in the validation set. In this example, all the nodes that are also high income earners (in ground truth set). False positives are all nodes in N_S(s) that do not belong to the target set (not high income earners). False positives are all nodes in N_S(s) that do not belong to the target set (not high income earners). False negatives are all nodes that belong to the validation set (are high income earners), but do not belong to N_S(s).

Based on the application, it is possible to require different tradeoffs between precision and recall. In the case of targeting an audience with an advertisement, a high recall rate is desired, since the cost of exposure (an advertisement) is low, whereas the cost of missing a member of a targeted audience is high.

In the example herein, the aim is to choose the value of s for which both the precision and recall rates are high from amongst possible values of s. For other types of distance function, there may be other parameters for which to try to maximize the precision and recall rates.

The accuracy of a lookalike model can only be defined for a target audience segment. For example, it is possible to predict whether a lookalike segment also comprises high income earners, from a seed set of high income earners using TV viewing and online behavior datasets. Predictions can be validated using a true set of income levels for the predicted set of nodes. This gives the accuracy of the predictions.

However, the accuracy of predictions for one segment are not meaningful for a new target segment, such as whether those same users are also luxury car drivers.

Calculating Deduplicated Reach

The consumer graph connects a node (consumer) to all the devices that he or she uses. Thus the graph enables deduplicating the total exposure to an advertisement, to individuals. For example, if user abc123 has already seen a particular advertisement on each of his TV, desktop and mobile device, the total deduplicated exposures will count as 1. This enables the calculation of the following metrics for direct measurement.

The deduplicated exposed audience is the number of users belonging to the target audience segment in the consumer graph who were exposed to the advertisement after deduplication. Then, the direct deduplicated reach is:

Deduplicated Reach=Deduplicated Exposed Audience/Total Audience

For sampled measurement, this enables the calculation of the deduplicated exposed sampled audience as the number of sampled users who belong to the target audience segment who were exposed to the advertisement after deduplication. Then, the sampled reach is:

Deduplicated Sampled Reach=Deduplicated Exposed Sampled Audience/Total Sampled Audience In the case of modeled measurement data, the ID of the user in the consumer graph from whom the data was collected is not known. Hence, the reach data cannot be deduplicated on a one-to-one level.

Calculation of deduplicated reach can be useful in targeting TV content, if an advertiser wants to impose a frequency cap on consumers (for example, if the advertiser doesn't want to show the same advert to the same user, or on the same TV, more than twice). Deduplicated reach therefore provides a convenient metric by which to optimize the efficacy of an advertising campaign: for example, by calculating the deduplicated reach over time, as an advertising campaign is adjusted, improvements can continue to be made by altering parameters of the campaign such as, for example, consumer demographic, or time and channel of broadcast of TV content.

Furthermore, with consumer data continually being received and utilized, an advertiser does not have to wait for weeks or months to learn the outcome of a campaign and decide how to improve a subsequent campaign. The advertiser can optimize its campaign while it is still ongoing, by, for example, redirecting content away from consumers who have already been exposed to an advertisement too many times, or redirecting content away from advertisers who are not responsive.

Calculating Incremental Reach

On day t, let the deduplicated reach (direct or sampled) be x. The incremental reach is the additional deduplicated reach after running the campaign. In a cross-screen environment, this is a useful parameter to calculate if an advertiser wants be able to assess whether they can extend a 30% reach via TV to say, a 35% reach by extending to mobile platforms. One caveat is that in direct measurement of, e.g., TV data, the portion of the sample obtained for smart-TV's is only a subset of the overall data, due to the relatively small number of smart-TV's currently in the population at large.

In the case of modeled measurement data such as is obtained from a panel where the nature of the sample has to be inferred, the ID of the user in the consumer graph from whom the data was collected is not known. Hence, it is not possible to tell if the same user has viewed the advertisement in the past. Therefore the incremental deduplicated reach cannot be calculated for modeled data because devices cannot be associated with particular users. Since the incremental reach from the sampled measurement, without deduplication, can be calculated, as described above, the methods herein are superior to panel-based methods.

Hashing Functions

Figure 6:
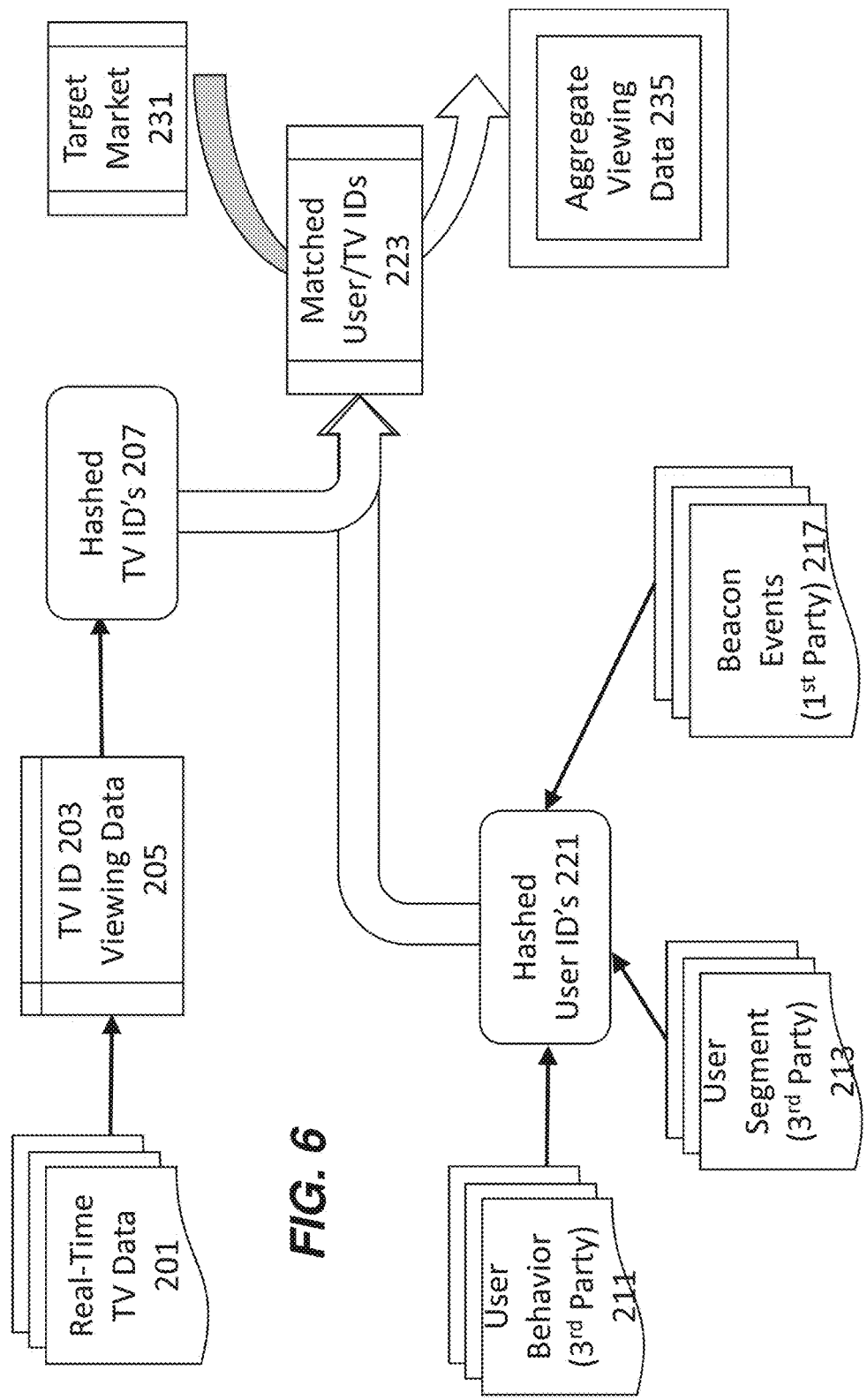
FIG. 6 shows a method of de-identifying consumer data, as used in a process for identifying advertising spots in a TV market.

FIG. 6 shows the various pieces of data that are utilized in identifying a population of TV viewers that will be promising targets for an advertiser. As described hereinbelow, an advertiser can select advertising inventory for purchase based on projected viewer data for a particular target market.

Real-time TV data 201 is stored by a OEM provider such as a cable company, or TiVo. Preferably the TV data includes data from TV, OTT devices, and VOD (such as HBO Go), of any combination of such sources. This data comprises viewing data 205, which includes the set of programs viewed on a particular TV, or device where TV content is being viewed, as well as an IP address for the TV, or the device where TV content is viewed. In the case of a programmatic TV or a set top box, the viewing data 205 may be associated with a TV ID 203, which is a device ID specific to a particular device, and distinct from an IP address. An IP address may be used to link multiple devices within the same household. It may encompass aspects that denote the brand or other attributes of the device. The TV ID's 203 and viewing data 205 are provided to an entity such as a demand-side provider for further manipulations in order to target advertising content. The data can be provided in any suitable format, for example, via an API.

The TV IDs, IP addresses, and viewing data are converted into hashed TV IDs 207 that comprise viewing data connected with a given TV. Hashing is important to protect consumers' privacy and means that key personally identifiable data is masked from further manipulations such as searching and direct targeting of content. Personally identifiable data includes IP addresses of particular devices (smart TV's, etc.). Accordingly, once the system has received data from a Smart-TV, it is obfuscated so that no-one can search on it, say, by IP address. Thus, in one embodiment of a hash function, the IP address is de-identified to a hash-ID, so that it can be queried without being able to search by individual TV. The IP address data can be hashed by an OEM provider before transmission to the DSP, or by the DSP. A preferred hash function is any 1-way hash function that will be familiar to those of skill in the art. The hashing process can be carried out by the DSP or it can be done by the OEM provider.

A data exchange with a third party data partner such as a DMP provides updated consumer behavior data 211 on a population of consumers from online data sources such as third party social media data, third party online purchase history, third party back link history, third party link history, first party acquired cookie data, and other opted in internet behavior data, which includes, browsing, social media content, purchases. Consumer behavior data therefore includes information about websites visited, as well as demographic data on a consumer, such as gender, age, location, and adverts previously viewed.

The consumer behavior data is typically aggregated from a number of other sources such as DMPs, or may be learned over time by the DSP. The consumer behavior data may contain or is converted to a form that comprises hashed consumer ID tags 221, in order to remove individual, personal, identifying information from the data. The data exchange may be continual or intermittent.

An additional, or alternative, data exchange with another third party data partner such as Experian leads to an update of customer segment data (for example, everyone who bought a particular category of item from a particular store, within a recent timeframe). The segment data may contain, or is converted to a form that comprises, hashed consumer ID tags 221, in order to remove individual, personal, identifying information from the data. The data exchange with various data partners may be continual or intermittent.

Figure 8:
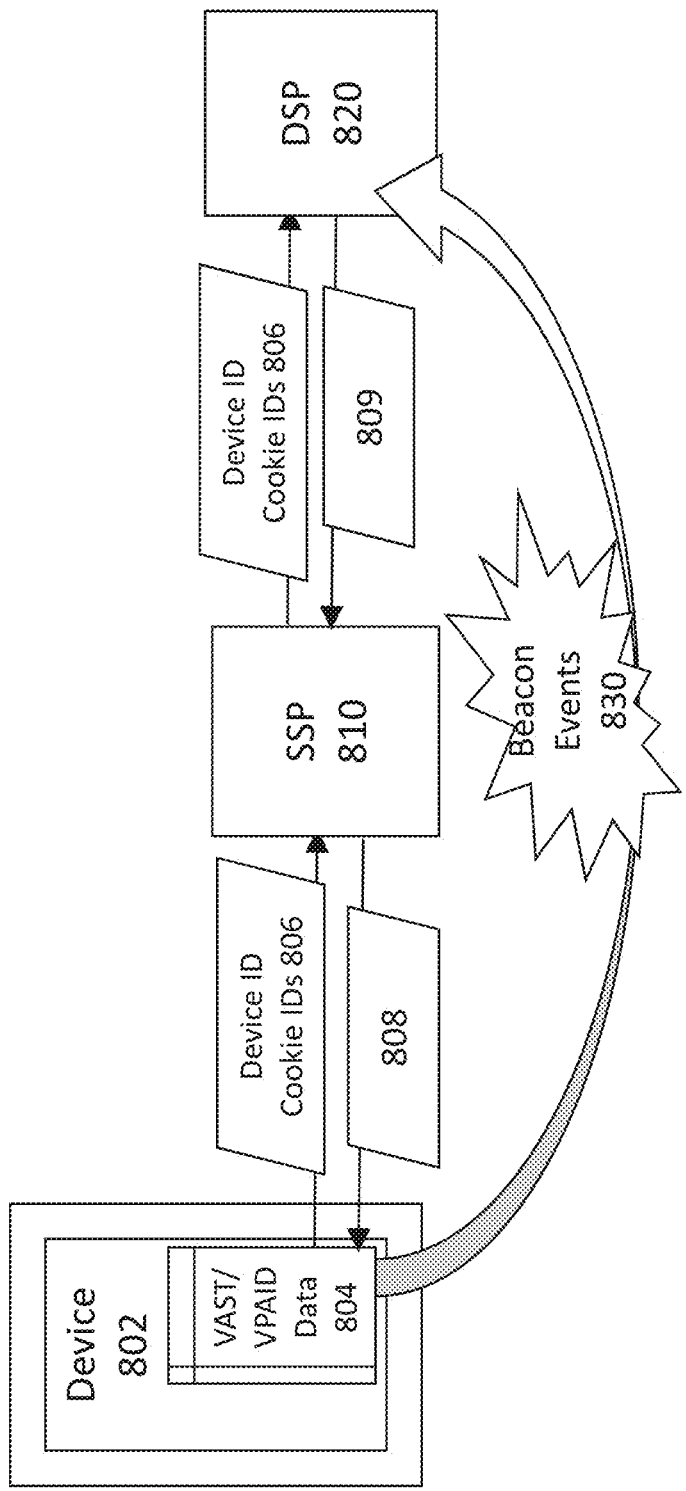
FIG. 8 shows schematically the communication of beacon event data from a consumer's device to a DSP.

An additional aspect is shown in FIG. 8. An optional data feed, which may be received by the DSP 820, updates first party beacon events 830 (such as from a VAST or VPAID tag 804 that is triggered when a particular event occurs, such as the consumer clicks on an advert, or minimizes the window containing the advert on the consumer's device 802). The beacon events contain hashed consumer ID tags 221, in order to remove individual, personal, identifying information from the data. The data feed may be continuous. First party data can therefore include information known about a particular consumer ID. At 808, the SSP serves an advert to the device. At 809 the DSP submits a bid price if it decides to bid on impression, or a "No bid" response, if it decides not to bid. Cookie ID (e.g., from a consumer's desktop computer) or device ID data 806 is communicated from the device, through the SSP and to the DSP, where it is matched to consumer ID.

The hashed user IDs now comprise the set of users connected to a given TV, i.e., such as users within a household who may have access to that TV.

A hashed ID synchronization 223 is then performed between the TV IDs and the user IDs. This may be performed on a single server, or a multitude of servers. Given that data on TV viewing habits and consumers themselves is being received continuously, the synchronization, or matching, should be updated frequently. Thus the process may take place periodically, or continuously.

The TV viewing data 205 can then be matched to the hashed User-IDs, during which the TV IDs are de-identified.

The matching can be performed in a "sandbox environment", i.e., one that is isolated, such as on a secure server, and is therefore not queryable, or otherwise accessible to third parties. The deletion of identifying information such as IP addresses, names and contact information, can also be performed in a sandbox environment.

The result of the process is a database that is being updated in real-time, and that contains aggregated hashed user ID's, each paired with a plurality of behavior and Segment data, and TV viewing data. This integrated data is made available for use by the DSP to an advertiser. The integrated data permits an advertiser to identify—and thus to target—a subset of the population that is defined by a mixture of demographics and viewing habits. For example, the advertiser can target males in the 18-30 age range, living in the Pacific Northwest, who have watched the TV program, The Simpsons, within the last two weeks.

Preferably, the fully integrated hashed ID data is stored under various categories of user that are searchable and made available for selection by advertisers.

An advertiser that wants to target those users that watch a particular TV show can find this information out using the hashed user ID. The advertiser can define a subset of consumers and then find TV content viewed and TV's associated with them. The advertiser can seek to purchase slots on analog TV via a separate channel from programmatic TV.

Additionally, an advertiser can make projections of advertising inventory for purchase based on historical viewer data for a particular target market. This becomes useful and important where viewing data exists for, e.g., TV series that reach their season end, or are discontinued. By recognizing patterns in viewer data, such as a characteristic viewers of a particular show tend to watch other specific shows, an advertiser can target their advertising content to delivery during the broadcast of other shows that are still being aired.

Programmatic-TV Bidding

A SSP (such as WideOrbit, Videa, Clypd) aggregates TV inventory from a plurality of local TV stations into a common marketplace. DSPs make bids for individual or multiple TV spots. Unlike RTB (real-time bidding, e.g., utilizing protocol RTB 2.0-2.4, see Internet Advertisers Bureau at www.iab.com/guidelines/real-time-bidding-rtb-project/), which can be utilized by the technology herein and applies to digital inventory and is such that the response time to acknowledge a bid is typically fractions of a second (often milliseconds), the feedback time on a TV bid can be anywhere from a single day to several weeks. Analog TV bidding is slower than programmatic TV bidding because it is not real-time and not susceptible to algorithmic implementations.

Additionally, for programmatic TV bidding, the feedback response can be one of accept, hold, or decline instead of just a win/loss response. This introduces additional complexity that current digital bidding solutions are not equipped to handle. A bidding architecture and method for PTV bidding consistent with the methods and technology herein is as follows.

Figure 10:
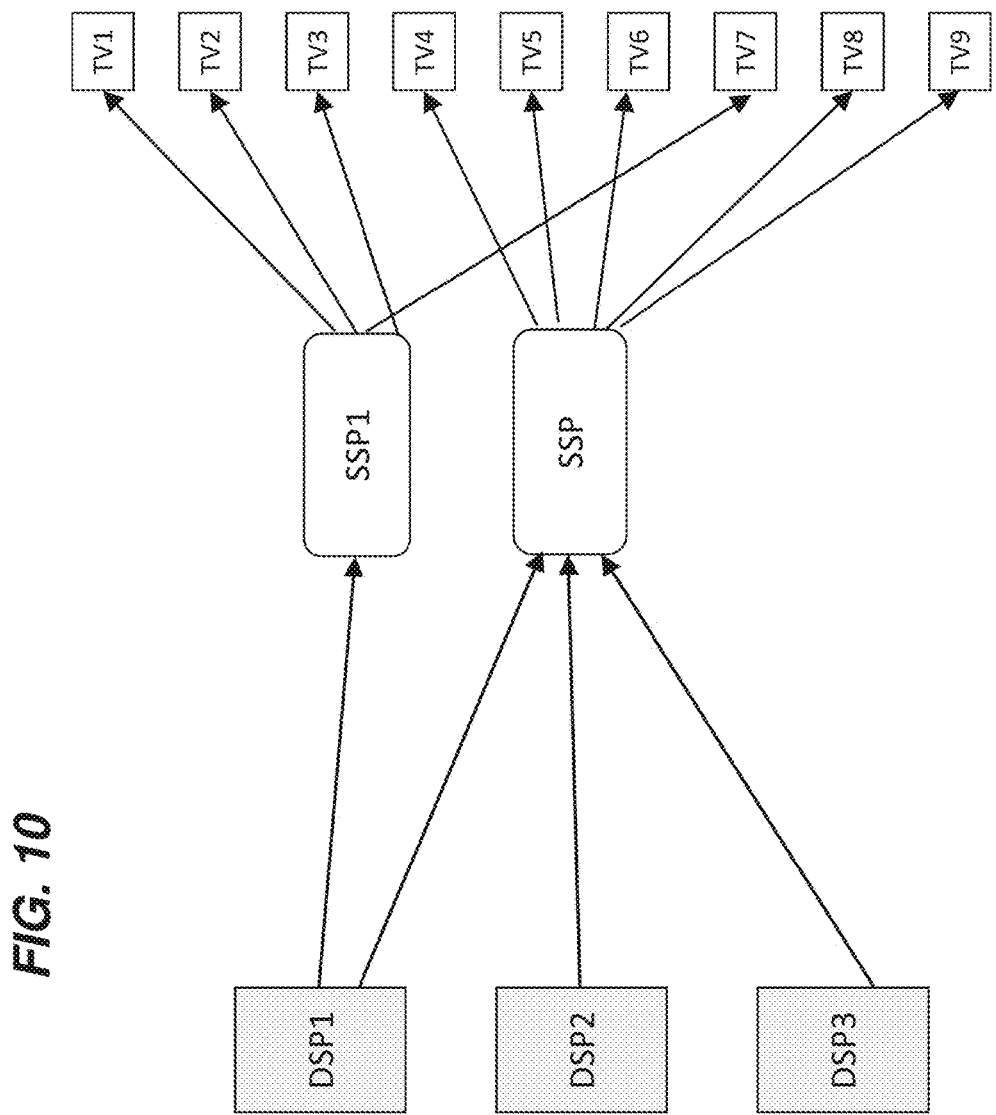
FIG. 10 shows relationships between various entities in the advertising purchase realm.

In the PTV marketplace, as illustrated in FIG. 10, one or more SSP's (SSP1, SSP2, etc.) such as WideOrbit, Videa or Clypd has a programmatic interface to all the TV supply, from TV stations shown as TV1 . . . TV9, and aggregates that supply. One or more demand side platforms, shown as DSP1-DSP3, such as entities that can perform the methods herein, have previously only used real-time bidder methods (RTB) to make bids on online inventory, and have accepted that the bidding process on TV inventory takes longer.

According to the methods herein, the decision to bid on an item of inventory, and the corresponding bid price, are based on expected performance of certain key performance indicators (KPIs). In the case of PTV inventory buying, the two main categories of KPI are "audience reach" and "direct response." KPI's can inform relevant optimization metrics. Another type of KPI is a gross rating point (GRP), which is one measure of the success of a campaign. A still further KPI is related to cost. Using methods herein it is possible to calculate the overall cost per audience member reached with a given campaign, because the amount budgeted for the campaign is known. In this way, an advertiser can compare the economic efficiency of various campaigns based on the effectiveness of targeting, and this KPI can be used to modify or improve upon an advertising campaign.

In the category, audience reach, KPIs relate to the exposure of the advertisement to targeted audience populations, as measured by the reach, or deduplicated reach.

By contrast, direct response KPIs relate to immediate actions taken by consumers exposed to an advertisement, such as: website visits (expressed as an average number of visits to the advertiser's website by users after being exposed to the advert); online purchases (purchases made in online stores e.g., Amazon.com, by users exposed to the advertisement); offline purchases (purchases made in physical stores, like a retail store or grocery store, by users exposed to the advertisement); and location events (the average number of times the users exposed to the advertisement visited a particular location after watching the advertisement).

Bidding on advertising slots based on programmatic TV data depends on targets set by the advertiser such as a certain minimum GRP, and one or more optimization metrics; the outcome is a choice of slots, and a bid price.

Bids are made for a future TV spot (i.e., a slot in a program schedule), and bids can typically be placed as much as two weeks in advance of that spot being aired. For special events such as sporting events whose date is known well in advance, bids may be placed even further ahead of time. Multiple bids can be placed for the same spot on separate days as a contingency if the bid on a preferred day was unsuccessful. There are several parameters that define a spot, including: the program title (e.g., The Simpsons), daypart (a portion of a given day in which the program is broadcast, e.g., Primetime, late night, which might permit differentiation between screening of new content vs. reruns), and the geographical area in which the program is broadcast (e.g. New York designated market area (DMA)).

There are two forms of uncertainty in the bidding and feedback process: whether a bid will be successful, and, if successful, what will be the performance of the advertisement. This leads to two types of bidding approaches: "exploration" and "exploitation". A unique aspect of this type of bidding is that there are tradeoffs between the two types of approach.

There are three possible outcomes of a bid: Win (success; the bid offer has been accepted by seller); loss (failure; the bid offer was declined by seller); and "hold" (the seller has accepted the bid as part of a block or "rotation" of spots/inventory).

A "hold" is an intermediate outcome for an advertiser. For example, if the advertiser bid on 2 of the 8 offered spots between 9 and 12 pm, and the seller commits to playing the ads in 2 of the 8 spots but without specifying which of the particular spots, that is a "hold".

Additional feedback can accompany a loss outcome, such as a possibility of revising and resubmitting the bid but in general, more informative information to the advertiser is gleaned from a hold.

This is a unique aspect of bidding on programmatic TV content. If a bid price wins, that maybe because it was too high. By contrast, a hold means in practice that the spot is locked and pooled together with other spots of a similar character. For example, there may be 10 slots available, and an advertiser bids on two of them. The two spots for which a "hold" is returned will be cleared when the whole block clears. That gives an advertiser a better idea of what price they can bid and be confident that they will not lose. For this reason, a hold outcome has more information (and thus a greater reduction in uncertainty) for an advertiser than a win outcome, since the advertiser can infer the clearing price for an entire block of spots when the response is a hold. Thus in programmatic TV bidding, a good heuristic is to aim for a Hold outcome, rather than a Win outcome, a factor that differentiates it from the digital RTB case.

In the bidding process, there is uncertainty over whether a bid price for a specific spot (a defined by program title, daypart, DMA, etc.) will lead to a win, loss, or hold. It is possible to construct a probability distribution, $\Pi$, of the outcome of a bid (win, loss or hold) for parameters (given by $\theta$) at a given bid price (P):

$$\Pi(\text{Outcome}=\text{Win/Loss/Hold}|\theta,P)$$

As a DSP obtains more sample data on outcomes at different bid prices for specific parameters, the less the uncertainty over the outcome. The probability distribution, $\Pi$, can be refined with Bayesian updating after observing each new data point.

The other form of uncertainty is how well the advert will perform in the given TV spot, as measured by audience reach or direct response KPIs. After the advertisement is served on a spot, by measuring the reach (such as GRPs) or direct response (like website visits), some aspect of performance can be quantified. Since the performance of a spot is not repeatable, (it can vary with time), the uncertainty of the spot's performance can be denoted by, for example: $\Pi(\text{KPI}=50 \text{ GRPs}|\theta)$.

Bayesian updating can be used to depict the uncertainty, which declines as more data points are observed.

When bidding on a TV spot, an advertiser wants to set a bid price so that it can achieve a win or hold outcome, as well as to bid on specific spots at a specific price to achieve an expected performance (an audience reach or direct response KPI). It is possible to identify a spot with low uncertainty on expected performance at a price that has a high probability of win/hold. This is the case for spots where a lot of data is available, and is the "exploit" scenario. Alternatively, it is possible to pick a spot and a price where there is very little or no sampled data; by finding a spot that has a high performance and leads to a win or a hold at low bid prices, it is possible to greatly reduce the uncertainty of the unknown spot. This is the "explore" scenario.

Figure 7:
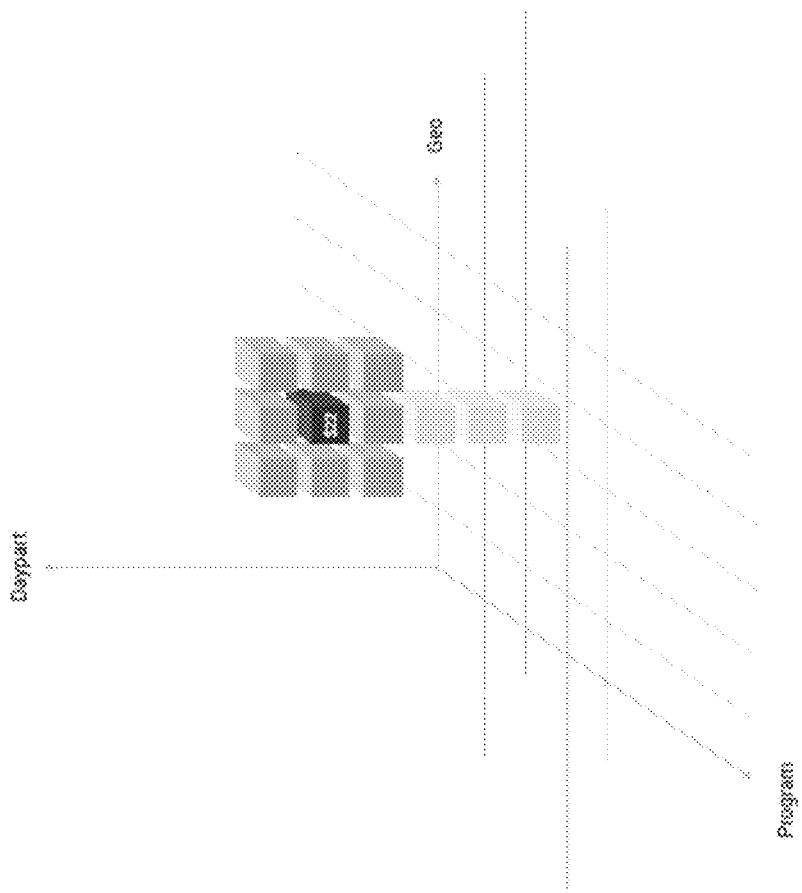
FIG. 7 shows a multi-dimensional data set.

The ability to base bids on a growing body of information about previously successful (and unsuccessful) bids allows the overall bidding process to me more efficient for a given advertiser. FIG. 7 illustrates this. From a lot of samples, suppose it is known that an advertiser can obtain a certain level of GRP's at a particular bid price ($22 in this example) and at particular values of a set of other variables. That bid price represents a location in multi-factor space, represented by the dark box in FIG. 7. In this example, for convenience of representation, there are three variables (shown on orthogonal axes as location, daypart, and program name), though in practice there may be more than 3. The gray boxes represent information (feedback values, or outcome probabilities) about less successful bids: if the advertiser can deviate from the optimal bid, the outcome will be close and the advertisement may give rise to a similar type of performance. This knowledge leads to reduced uncertainty in the outcome of a bid, and is based on an iterative learning process. The darker the box in the grid, the more certain the outcome. The values for the other boxes allow an advertiser to make inferences on the values of similar blocks of inventory, based on having similar parameters, such as same daypart or same geographic location.

The objective of bidding is to maximize the performance metric (audience reach, or direct response KPIs) at a given price, or to achieve a level of performance for the lowest cost. Since the performance is uncertain, another spot for which data is not available could have performed better at a lower cost. Thus in the long term, for the bidder, there is value in data collection by exploring spots with high uncertainty. This principle is captured by an exploration bonus parameter, U. The general form of the objective function is given by equation (1):

$$\text{Value[spot]}=\text{ExpectedValue[spot]}+U*\text{Reduction in Uncertainty[spot]} \qquad (1)$$

The expected value of the spot is obtained from the expected performance by integrating over the uncertainty values. Thus, an exemplary definition of the expected value is given by equation (2):

$$\text{ExpectedValue}[\text{spot}] = \Sigma_\theta P(KPI = x | \theta) \sigma(KPI | \theta) \quad (2)$$

Here $\sigma(KPI|\theta)$ is the uncertainty over the value that KPI will equal x for a given theta. The sum is taken over all values of theta.

The reduction in uncertainty of the spot can be given by criteria such as the expected reduction in entropy, or value of information, or information gain, according to formulae standard in the art.

An exemplary definition of change in uncertainty is given by equation (3):

$$\Delta\text{Uncertainty}[\theta] = \sigma(KPI|\theta) - \Sigma_x \sigma(KPI = x | \theta) \quad (3)$$

where the sum is taken over all discretized values of the KPI.

Bidding Algorithm

An exemplary method of bidding on a Programmatic TV slot, can be expressed as follows. First, an advertiser sets a target budget, B. In the following, let S denote the set of all available spots.
  i. Enumerate all sets s in S.
  ii. Compute the value of set s using Equation (1).
  iii. Assign a bid price P(s) to each s, using a prior distribution P(Outcome=Win/Loss/Hold|s, P(s)).

The prior distribution can be estimated from rate card data, such as ones provided by a company such as SQAD (Tarrytown, N.Y.; internet at sqad.com). Certain data providers specialize in information for TV buying: based on relationships with sources of TV inventory spots, they supply price ranges for advertising slots.
  iv. Enumerate all (non-repeating) combinations of s, and denote each combination by θ.
  v. Calculate a Score by summing over all values of s in θ.
  vi. Score[θ]=$\Sigma_s$ P(s) P(Outcome=Win/Hold|s, P(s)) P(KPI=x|s)
  vii. Choose the Theta with the highest score such that the expected target budget $\Sigma_s$ P(s) P(Outcome=Win/Hold|s, P(s))<=B.

The spots to bid on are the ones in the combination θ, that maximize the value of the Score, and whose expected target budget is less than B.

The expected target budget is calculated by taking into account the probability that the bid price P(s) will have an outcome of Win or Hold. Essentially, if the average probability of a Win or Hold outcome is expected to be 0.10, then by bidding on spots with a total budget of 10B, the advertiser expects to spend a budget of B.

PTV Bidding different from digital real-time bidding (RTB), which is utilized for online and other digital applications (for example, as handled by other DSP's), in at least two ways.

In RTB, a bid request is broadcast by a supplier for an immediately available impression. Bidders respond with a maximum bid price, based on the parameters of the bid request. There is typically a short time window (less than 50 ms) to receive bids. Once all the bids are accepted, the exchange conducts a second price auction. The winner gets notified, and all others receive a notification of loss. The uncertainty for the advertiser is over the probability of obtaining a winning bid at a given price. In some embodiments, a machine learning system may be used to construct a probability distribution of a win ratio vs. price to learn the optimal bid price.

In Programmatic TV bidding, bids are accepted for upcoming spots, up to 14 days in advance. Instead of a win/loss outcome, bidders receive one of a win, loss or a hold result. With a loss signal, additional feedback can be provided so that the bidder can revise and resubmit the bid offer. A machine learning system constructs a probability distribution of win, hold, and loss rates for different bid prices, and parameters that define a spot. The probability distribution to be learned is more complex (and has more dimensions) than the RTB case.

Computational Implementation

The computer functions for manipulations of advertising campaign data, advertising inventory, and consumer and device graphs, in representations such as bit-strings, can be developed by a programmer or a team of programmers skilled in the art. The functions can be implemented in a number and variety of programming languages, including, in some cases mixed implementations. For example, the functions as well as scripting functions can be programmed in functional programming languages such as: Scala, Golang, and R. Other programming languages may be used for portions of the implementation, such as Prolog, Pascal, C, C++, Java, Python, VisualBasic, Perl, .Net languages such as C#, and other equivalent languages not listed herein. The capability of the technology is not limited by or dependent on the underlying programming language used for implementation or control of access to the basic functions. Alternatively, the functionality could be implemented from higher level functions such as tool-kits that rely on previously developed functions for manipulating mathematical expressions such as bit-strings and sparse vectors.

The technology herein can be developed to run with any of the well-known computer operating systems in use today, as well as others, not listed herein. Those operating systems include, but are not limited to: Windows (including variants such as Windows XP, Windows95, Windows2000, Windows Vista, Windows 7, and Windows 8, Windows Mobile, and Windows 10, and intermediate updates thereof, available from Microsoft Corporation); Apple iOS (including variants such as iOS3, iOS4, and iOS5, iOS6, iOS7, iOS8, and iOS9, and intervening updates to the same); Apple Mac operating systems such as OS9, OS 10.x (including variants known as "Leopard", "Snow Leopard", "Mountain Lion", and "Lion"; the UNIX operating system (e.g., Berkeley Standard version); and the Linux operating system (e.g., available from numerous distributors of free or "open source" software).

To the extent that a given implementation relies on other software components, already implemented, such as functions for manipulating sparse vectors, and functions for calculating similarity metrics of vectors, those functions can be assumed to be accessible to a programmer of skill in the art.

Furthermore, it is to be understood that the executable instructions that cause a suitably-programmed computer to execute the methods described herein, can be stored and delivered in any suitable computer-readable format. This can include, but is not limited to, a portable readable drive, such as a large capacity "hard-drive", or a "pen-drive", such as connects to a computer's USB port, an internal drive to a computer, and a CD-Rom or an optical disk. It is further to be understood that while the executable instructions can be stored on a portable computer-readable medium and delivered in such tangible form to a purchaser or user, the executable instructions can also be downloaded from a remote location to the user's computer, such as via an Internet connection which itself may rely in part on a wireless technology such as WiFi. Such an aspect of the technology does not imply that the executable instructions take the form of a signal or other non-tangible embodiment. The executable instructions may also be executed as part of a "virtual machine" implementation.

The technology herein is not limited to a particular web browser version or type; it can be envisaged that the technology can be practiced with one or more of: Safari, Internet Explorer, Edge, FireFox, Chrome, or Opera, and any version thereof.

Computing Apparatus

Figure 9:
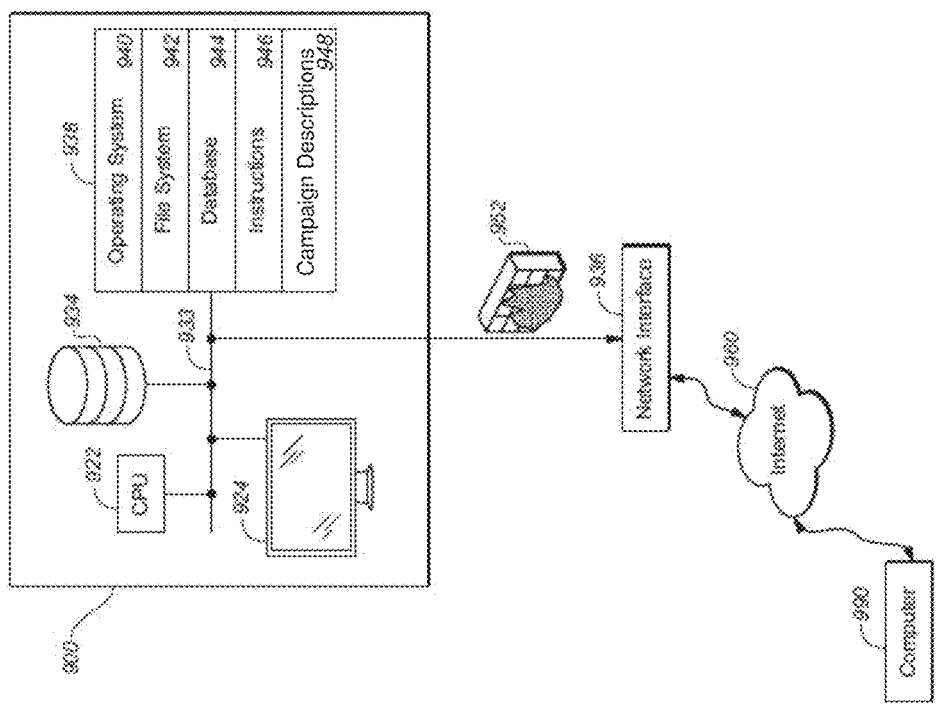
FIG. 9 shows an apparatus for performing a process as described herein.

An exemplary general-purpose computing apparatus 900 suitable for practicing the methods described herein is depicted schematically in FIG. 9.

The computer system 900 comprises at least one data processing unit (CPU) 922, a memory 938, which will typically include both high speed random access memory as well as non-volatile memory (such as one or more magnetic disk drives), a user interface 924, one more disks 934, and at least one network or other communication interface connection 936 for communicating with other computers over a network, including the Internet, as well as other devices, such as via a high speed networking cable, or a wireless connection. There may optionally be a firewall 952 between the computer and the Internet. At least the CPU 922, memory 938, user interface 924, disk 934 and network interface 936, communicate with one another via at least one communication bus 933.

CPU 922 may optionally include a vector processor, optimized for manipulating large vectors of data.

Memory 938 stores procedures and data, typically including some or all of: an operating system 940 for providing basic system services; one or more application programs, such as a parser routine 950, and a compiler (not shown in FIG. 9), a file system 942, one or more databases 944 that store advertising inventory 946, campaign descriptions 948, and other information, and optionally a floating point coprocessor where necessary for carrying out high level mathematical operations. The methods of the present invention may also draw upon functions contained in one or more dynamically linked libraries, not shown in FIG. 9, but stored either in memory 938, or on disk 934.

The database and other routines shown in FIG. 9 as stored in memory 938 may instead, optionally, be stored on disk 934 where the amount of data in the database is too great to be efficiently stored in memory 938. The database may also instead, or in part, be stored on one or more remote computers that communicate with computer system 900 through network interface 936.

Memory 938 is encoded with instructions for receiving input from one or more advertisers and for calculating a similarity score for consumers against one another. Instructions further include programmed instructions for performing one or more of parsing, calculating a metric, and various statistical analyses. In some embodiments, the sparse vector themselves are not calculated on the computer 900 but are performed on a different computer and, e.g., transferred via network interface 936 to computer 900.

Various implementations of the technology herein can be contemplated, particularly as performed on computing apparatuses of varying complexity, including, without limitation, workstations, PC's, laptops, notebooks, tablets, netbooks, and other mobile computing devices, including cell-phones, mobile phones, wearable devices, and personal digital assistants. The computing devices can have suitably configured processors, including, without limitation, graphics processors, vector processors, and math coprocessors, for running software that carries out the methods herein. In addition, certain computing functions are typically distributed across more than one computer so that, for example, one computer accepts input and instructions, and a second or additional computers receive the instructions via a network connection and carry out the processing at a remote location, and optionally communicate results or output back to the first computer.

Control of the computing apparatuses can be via a user interface 924, which may comprise a display, mouse 926, keyboard 930, and/or other items not shown in FIG. 9, such as a track-pad, track-ball, touch-screen, stylus, speech-recognition, gesture-recognition technology, or other input such as based on a user's eye-movement, or any subcombination or combination of inputs thereof. Additionally, implementations are configured that permit a purchaser of advertising inventory to access computer 900 remotely, over a network connection, and to view inventory via an interface having attributes comparable to interface 924.

In one embodiment, the computing apparatus can be configured to restrict user access, such as by scanning a QR-code, gesture recognition, biometric data input, or password input.

The manner of operation of the technology, when reduced to an embodiment as one or more software modules, functions, or subroutines, can be in a batch-mode—as on a stored database of inventory and consumer data, processed in batches, or by interaction with a user who inputs specific instructions for a single advertising campaign.

The results of matching advertising inventory to criteria for an advertising campaign, as created by the technology herein, can be displayed in tangible form, such as on one or more computer displays, such as a monitor, laptop display, or the screen of a tablet, notebook, netbook, or cellular phone. The results can further be printed to paper form, stored as electronic files in a format for saving on a computer-readable medium or for transferring or sharing between computers, or projected onto a screen of an auditorium such as during a presentation.

ToolKit: The technology herein can be implemented in a manner that gives a user (such as a purchaser of advertising inventory) access to, and control over, basic functions that provide key elements of advertising campaign management. Certain default settings can be built in to a computer-implementation, but the user can be given as much choice as possible over the features that are used in assigning inventory, thereby permitting a user to remove certain features from consideration or adjust their weightings, as applicable.

The toolkit can be operated via scripting tools, as well as or instead of a graphical user interface that offers touch-screen selection, and/or menu pull-downs, as applicable to the sophistication of the user. The manner of access to the underlying tools by a user is not in any way a limitation on the technology's novelty, inventiveness, or utility.

Accordingly, the methods herein may be implemented on or across one or more computing apparatuses having processors configured to execute the methods, and encoded as executable instructions in computer readable media.

For example, the technology herein includes computer readable media encoded with instructions for executing a method for targeting a population of TV viewers to which to deliver advertising content, the instructions including: instructions for receiving programmatic TV data for a first population of consumers; instructions for de-identifying the IP address for each TV, and for creating a hash-ID for each TV that is associated with each consumer in the first population of consumers; instructions for associating the hash-ID for each TV with a consumer identifier in a graph of consumer data, instructions for constructing a graph of consumer data from online behavioral and demographic data on a second population of consumers; instructions for identifying one or more slots of TV advertising inventory based on one or more demographic factors of consumers in the second population of consumers and the list of TV viewing data associated with those consumers; instructions for purchasing a slot of TV advertising inventory relevant to the second population of consumers; and instructions for communicating with a media conduit to deliver an item of advertising content to the second population of consumers in the one or more slots of inventory.

Correspondingly, the technology herein also includes a computing apparatus having at least one processor configured to execute instructions for implementing a method for targeting a population of TV viewers to which to deliver advertising content, the instructions including: instructions for receiving programmatic TV data for a first population of consumers; instructions for de-identifying the IP address for each TV, and for creating a hash-ID for each TV that is associated with each consumer in the first population of consumers; instructions for associating the hash-ID for each TV with a consumer identifier in a graph of consumer data, instructions for constructing a graph of consumer data from online behavioral and demographic data on a second population of consumers; instructions for identifying one or more slots of TV advertising inventory based on one or more demographic factors of consumers in the second population of consumers and the list of TV viewing data associated with those consumers; instructions for purchasing a slot of TV advertising inventory relevant to the second population of consumers; and instructions for communicating with a media conduit to deliver an item of advertising content to the second population of consumers in the one or more slots of inventory.

Furthermore, the technology herein includes a computing apparatus configured to execute instructions for bidding on programmatic TV content, as well as computer readable media encoded with instructions for carrying out programmatic TV bidding.

Cloud Computing

The methods herein can be implemented to run in the "cloud." Thus the processes that one or more computer processors execute to carry out the computer-based methods herein do not need to be carried out by a single computing machine or apparatus. Processes and calculations can be distributed amongst multiple processors in one or more datacenters that are physically situated in different locations from one another. Data is exchanged with the various processors using network connections such as the Internet. Preferably, security protocols such as encryption are utilized to minimize the possibility that consumer data can be compromised. Calculations that are performed across one or more locations remote from an entity such as a DSP include calculation of consumer and device graphs, and updates to the same.

EXAMPLES

Example 1: Identification Hashing in the Autonomous Indexing of TV Advertising with Market Segments An embodiment has been implemented employing apparatus and processes as described elsewhere herein.

An online user-interface is provided to advertising inventory buyers. From the user-interface, buyers choose from a list of available target market segments, such as, for example, women between the ages of 17 and 28 who would like to make a car purchase. Market segment selections can be made broad or narrow, such that the inventory buyer can select from a number of possible combinations.

The target audience segments are an aggregated view of various online consumption behavior. The targeted market segment categories are derived from online data sources such as third party social media data, third party online purchase history, third party back link history, third party link history, first party acquired cookie data, and other opted in internet behavior data, which includes, browsing, social media content, purchases. The end-user platform intakes the data from a plurality of third party sources, including a variety of DMP partners who have independently collected and integrated the data. The platform performs server to server cookie syncing and mapping to existing data in the platform's servers, which includes a plurality of third party sources as well as first party collected beacon data. Once integrated, the data is mapped to TV/OTT/VOD viewership data, which may contain identifying IP addresses. In a sandbox environment, the TV/OTT/VOD viewership data is mapped to an assortment of hashed ID data and is immediately de-identified via a process of autonomous IP address deletion. IP address data is autonomously discarded, leaving only the hashed ID paired with viewership metadata.

In one example application, a platform user selects market segments by choosing the following criteria: males 18-34 who have interest in BMWs, people who eat Cheerios, people who are both 18-34 and eat Cheerios; people who are male 18-34 who do not eat Cheerios; or any other logical combination thereof. The system operates a search that returns a list of hashed consumer IDs correlating to a plurality of third party and first party consumer behavior data specific to the hashed consumer ID. The end-user is protected from exposure to identifying consumer information, such as IP addresses, name or contact information.

Once the user has submitted market segment selections, a backend process is provided. The selected market segments are autonomously paired with hashed IDs corresponding to actual online users that meet the user-selected criteria. The hashed IDs represent IP addresses, mobile devices, social media accounts, and other uniquely identified media mediums that have been collected and tagged by the platform.

The end-user system contains a library of market segment categories that is continuously updated with new market segment information as third party data is integrated in real-time. The real-time data integration permits the end-user to select market segments accurately gauge and predict future consumer behavior. As new third party data is integrated, the end-user system provides a unique anonymous end-user ID for that individual, for example: #WHFKCNJ164829DHAHH17, is provided to a media consumer that is being added for the first time into the end-user library.

In a parallel process, the platform continuously aggregates user media consumption behavior across devices and compiles the behavior by unique consumer IDs. For example, the platform intakes third-party data from a social media provider such as Nielsen or Exelate and pairs identifying information from other third party platforms such as Television VOD, and e-commerce websites and the like. The platform runs a normalization algorithm that aggregates data under unique consumer IDs such that a single user ID has online behavior from a plurality of third party platforms tagged with the unique ID.

The platform continuously normalizes incoming data with unique consumer IDs. The aggregated data, now tagged with unique consumer IDs, is available to end-user advertising inventory system.

The end-user advertising inventory system intakes new consumer data with consumer IDs, and continuously pairs the consumer IDs with its internal hashed IDs. The end-user inventory buyer and the platform provider is masked from using identifying information when making target market selections.

The platform provider may make a variety of end-user accounts available with unique logins, user-dashboards, user-controls, privacy settings and the like.

All references cited herein are incorporated by reference in their entireties.

The foregoing description is intended to illustrate various aspects of the instant technology. It is not intended that the examples presented herein limit the scope of the appended claims. The invention now being fully described, it will be apparent to one of ordinary skill in the art that many changes and modifications can be made thereto without departing from the spirit or scope of the appended claims.

What is claimed:

1. A method for targeting a population of TV viewers to which to deliver advertising content, the method being performed by at least one computer system containing at least one hardware processor and at least one memory storing instructions that when executed by the at least one processor, cause the at least one computer system to perform operations comprising:

receiving, by the at least one hardware processor, TV data for a first population of consumers, wherein the TV data comprises at least one IP address and a list of TV viewing data for each TV accessible to a consumer in the first population of consumers;

de-identifying, by the at least one hardware processor, the IP address for each TV, thereby creating a hash-ID for each TV that is associated with each consumer in the first population of consumers;

associating, by the at least one hardware processor, the hash-ID for each TV with a consumer identifier in a graph of consumer data, the graph being of a set of nodes and edges connecting pairs of nodes, where two nodes that are connected by an edge are similar to one another according to at least a criterion, and wherein a weight of an edge defines a strength of similarity, wherein the graph of consumer data is constructed from online behavioral and demographic data on a second population of consumers;

identifying, by the at least one hardware processor, one or more slots of TV advertising inventory based on one or more demographic factors of consumers in the second population of consumers and the list of TV viewing data associated with those consumers;

providing, by the at least one hardware processor, a way for an advertiser to purchase a slot of TV advertising inventory relevant to the second population of consumers; and, after an advertiser purchases a slot of TV advertising inventory, instructing, by the at least one hardware processor, a media conduit to deliver the item of advertising content to the second population of consumers in the one or more slots of inventory.

2. The method of claim 1, wherein the TV data comprises programmatic TV data.

3. The method of claim 1, wherein the purchasing comprises bidding on inventory, wherein the bidding is by real-time bidding or by bidding on programmatic TV content.

4. The method of claim 1, wherein the providing a way for an advertiser to purchase, comprises:

presenting, via a browser or web-enabled interface, a market segment selection form permitting an advertiser to select from a variety of market segment categories.

5. The method of claim 1, wherein the consumer data comprises transmutable and non-transmutable data.

6. The method of claim 1, wherein the identifying comprises:

predicting, via a machine learning process, one or more inventory slots for a particular market segment.

7. The method of claim 1, wherein the de-identifying uses a one-way hash function.

8. The method of claim 1, wherein the one or more hardware processes are physically distributed amongst multiple datacenters.

* * * * *